United States Patent
Rentz et al.

(10) Patent No.: US 11,275,376 B2
(45) Date of Patent: Mar. 15, 2022

(54) LARGE SCALE UNMANNED MONITORING DEVICE ASSESSMENT OF UTILITY SYSTEM COMPONENTS

(71) Applicant: Florida Power & Light Company, Juno Beach, FL (US)

(72) Inventors: Iliana Maria Rentz, West Palm Beach, FL (US); Eric D. Schwartz, Palm Beach Gardens, FL (US); Jeffrey D. Dubs, North Palm Beach, FL (US)

(73) Assignee: Florida Power & Light Company, Juno Beach, FL (US)

( * ) Notice: Subject to any disclaimer, the term of this patent is extended or adjusted under 35 U.S.C. 154(b) by 358 days.

(21) Appl. No.: 16/446,851

(22) Filed: Jun. 20, 2019

(65) Prior Publication Data

US 2020/0401138 A1    Dec. 24, 2020

(51) Int. Cl.
*G01D 1/00* (2006.01)
*G05D 1/00* (2006.01)
(Continued)

(52) U.S. Cl.
CPC ......... *G05D 1/0094* (2013.01); *B64C 39/024* (2013.01); *G01N 21/952* (2013.01);
(Continued)

(58) Field of Classification Search
CPC ...... G05D 1/0094–0027; B64C 39/024; B64C 2201/12; G01N 21/952; G01W 1/00; G06Q 10/0631–20
See application file for complete search history.

(56) References Cited

U.S. PATENT DOCUMENTS 7,391,298 B1 *  6/2008  Campbell ............. H04L 67/025
                                                    340/286.02
9,162,753 B1   10/2015  Panto et al.
(Continued)

FOREIGN PATENT DOCUMENTS

CN          206460332       9/2017
WO    WO-2009142933 A2 *  11/2009 ............. G05D 1/104
(Continued)

OTHER PUBLICATIONS

Debusk, Wesley. (2009). Unmanned Aerial Vehicle Systems for Disaster Relief: Tornado Alley.
(Continued)

*Primary Examiner* — Calvin Cheung
(74) *Attorney, Agent, or Firm* — Fleit Intellectual Property Law; Thomas S. Grzesik

(57) ABSTRACT

Large-scale unmanned monitoring devices, such as unmanned aerial vehicles (UAV), drones or rovers capable of operating within environmental conditions not suitable for human personnel and lesser capable monitoring devices may inspect system components within an area of interest (AOI) such an electric power distribution system including generation, transmission, and distribution elements for autonomous detection of damage to the components. The large-scale unmanned monitoring devices may inspect the system components while the environmental conditions are occurring. Work orders for repairing the damage are autonomously generated and resources identified within the work orders are autonomously provisioned.

20 Claims, 12 Drawing Sheets

(51) Int. Cl.
*G01W 1/00* (2006.01)
*G01N 21/952* (2006.01)
*B64C 39/02* (2006.01)
*G06Q 10/00* (2012.01)
*G06Q 10/06* (2012.01)

(52) U.S. Cl.
CPC ............ *G01W 1/00* (2013.01); *G05D 1/0027* (2013.01); *G06Q 10/0631* (2013.01); *G06Q 10/20* (2013.01); *B64C 2201/12* (2013.01)

(56) References Cited

U.S. PATENT DOCUMENTS

| | | | |
|---|---|---|---|
| 9,346,578 | B2 | 5/2016 | Selker et al. |
| 9,505,494 | B1 | 11/2016 | Marlow et al. |
| 9,665,094 | B1 | 5/2017 | Russell |
| 9,678,507 | B1* | 6/2017 | Douglas ............... G08G 5/0069 |
| 9,784,836 | B2 | 10/2017 | Heinonen et al. |
| 9,846,915 | B2 | 12/2017 | Howe et al. |
| 9,922,412 | B1 | 3/2018 | Freeman et al. |
| 10,002,339 | B2 | 6/2018 | Prieto et al. |
| 10,032,267 | B2 | 7/2018 | Strebel et al. |
| 10,089,889 | B2 | 10/2018 | Petterson et al. |
| 10,102,428 | B2 | 10/2018 | Loveland et al. |
| 10,134,092 | B1 | 11/2018 | Harvey et al. |
| 10,899,475 | B1* | 1/2021 | Freeman, Jr. ......... B64C 39/024 |
| 2011/0204898 | A1* | 8/2011 | Kim .................... G01R 19/2506 324/434 |
| 2014/0336928 | A1 | 11/2014 | Scott |
| 2017/0092109 | A1* | 3/2017 | Trundle ............. H04B 7/18504 |
| 2017/0154536 | A1* | 6/2017 | Kreiner ................. G06Q 10/00 |
| 2017/0277180 | A1* | 9/2017 | Baer ...................... G01S 17/933 |
| 2017/0334559 | A1* | 11/2017 | Bouffard .............. G08G 5/0082 |
| 2018/0002010 | A1* | 1/2018 | Bauer ................... B64C 39/024 |
| 2018/0190132 | A1 | 7/2018 | Cronkhite et al. |
| 2018/0314995 | A1 | 11/2018 | Katz et al. |
| 2019/0026886 | A1 | 1/2019 | Ferguson et al. |
| 2019/0107846 | A1* | 4/2019 | Roy ..................... G08G 5/0008 |
| 2019/0176984 | A1* | 6/2019 | Wabnegger .......... G05D 1/0022 |
| 2019/0188521 | A1* | 6/2019 | Barzelay .............. G06K 9/6202 |
| 2020/0226728 | A1* | 7/2020 | Han ........................ G06T 5/009 |

FOREIGN PATENT DOCUMENTS

| | | |
|---|---|---|
| WO | 2017116860 | 7/2017 |
| WO | 2017223531 | 12/2017 |
| WO | 2018089268 | 5/2018 |

OTHER PUBLICATIONS

Lim, Gino & Kim, Seon Jin & Cho, Jaeyoung & Gong, Yibin & Khodaei, Amin. (2016). Multi-UAV Pre-Positioning and Routing for Power Network Damage Assessment. IEEE Transactions on Smart Grid. pp. 1-1.

Habib, Maki & Baudoin, Yvan. (2010). Robot-Assisted Risky Intervention, Search, Rescue and Environmental Surveillance. International Journal of Advanced Robotic Systems.

Chowdhury, Sudipta & Emelogu, Adindu & Marufuzzaman, Mohammad & Nurre, Sarah & Bian, Linkan. Drones for Disaster Response and Relief Operations: A Continuous Approximation Model. International Journal of Production Economics 199 (2017) pp. 167-184.

* cited by examiner

| 500 | | | | | | | | | | | |
|---|---|---|---|---|---|---|---|---|---|---|---|
| | 508 | 510 | 512 | 514 | 516 | 518 | 520 | 522 | 524 | 526 | 528 |
| | DEVICE ID | DEVICE TYPE | ENVRN CPBLTY | POWER SOURCES | COMM | SENSOR/ FEATURES | MOBILITY | OP FEATURES | LOC | OP TIME | OP COSTS |
| 502 | DEV_1 530 | TYPE_A 532 | CPBLTY_A 534 | PWR_A 536 | COM_A 538 | FTRS_A 540 | MOB_A 542 | OP_A 544 | LOC_A 546 | TM_A 548 | CST_A 550 |
| 504 | DEV_2 | TYPE_B | CPBLTY_B | PWR_B | COM_B | FTRS_B | MOB_B | OP_B | LOC_B | TM_B | CST_B |
| | ... | ... | ... | ... | ... | ... | ... | ... | ... | ... | ... |
| 506 | DEV_N | TYPE_N | CPBLTY_N | PWR_N | COM_N | FTRS_N | MOB_N | OP_N | LOC_N | TM_N | CST_N |

FIG. 5

| 600 | | | | | | | |
|---|---|---|---|---|---|---|---|
| | 608 | 610 | 612 | 614 | 616 | 618 | 620 |
| | AOI ID | LOCATION | SIZE | TERRAIN TYPE | ELEVATION | FEATURES | HISTORICAL WEATHER |
| 602 | AOI_1 622 | LOC_A 624 | SIZE_A 626 | TER_A 628 | ELV_A 630 | FTRS_A 632 | HWTHR_A 634 |
| 604 | AOI_2 | LOC_B | SIZE_A | TER_B | ELV_B | FTRS_B | HWTHR_B |
| | ... | ... | ... | ... | ... | ... | ... |
| 606 | AOI_N | LOC_N | SIZE_N | TER_N | ELV_N | FTRS_N | HWTHR_N |

FIG. 6

| COMPONENT ID 708 | COMPONENT TYPE 710 | AOI 712 | PART NUMBER 714 | LOCATION 716 | FUNCTION 718 | |
|---|---|---|---|---|---|---|
| CID_1 720 | TYPE_A 722 | AOI_1 724 | PRT_A 726 | LOC_1 728 | FNC_A 730 | ⋮ |
| CID_2 | TYPE_B | AOI_2 | PRT_B | LOC_2 | FNC_B | ⋮ |
| ⋮ | | ⋮ | ⋮ | ⋮ | ⋮ | ⋮ |
| CID_N | TYPE_N | AOI_N | PRT_N | LOC_N | FNC_N | ⋮ |

FIG. 7

| 800 | INSPECTION PATH ID 810 | DEVICE ID 812 | COORDINATE DATA 814 | ALTITUDE DATA 816 | SPEED DATA 818 | TEMPORAL DATA 820 | INSPECTION ANGLE(S) 822 |
|---|---|---|---|---|---|---|---|
| 802 | IP_1 824 | DEV_A 826 | CRDSET_A 828 | ALTSET_A 830 | SPDSET_A 832 | T_A 834 | ANG_A ANG_B 836 |
| 804 | IP_2 | DEV_B | CRDSET_B | ALTSET_B | SPDSET_B | T_B | ANG_C |
| 806 | IP_3 | DEV_C | CRDSET_C | ALTSET_C | SPDSET_C | T_C | ANG_D |
| | ⋮ | ⋮ | ⋮ | ⋮ | ⋮ | | |
| 808 | IP_N | DEV_N | CRDSET_N | ALTSET_N | SPDSET_N | T_N | ANG_N ANG_X |
| | ⋮ | ⋮ | ⋮ | ⋮ | ⋮ | ⋮ | ⋮ |

FIG. 8

| COMPONENT ID 908 | AOI 910 | LOCATION 912 | OP STATE 914 | DAMAGE TYPE(S) 916 | DAMAGED PART(S) 918 | TIME 920 | WEATHER 922 |
|---|---|---|---|---|---|---|---|
| CID_1 924 | AOI_1 926 | LOC_1 928 | OP 930 | N/A 932 | N/A 934 | T_A 936 | WTHR_A 938 |
| CID_2 | AOI_A | LOC_2 | NON_OP | DMG_A | PART_A | T_B | WTHR_B |
| ⋮ | ⋮ | ⋮ | ⋮ | ⋮ | ⋮ | ⋮ | ⋮ |
| CID_N | AOI_Y | LOC_N | OBSTR | DMG_N | PART_N | T_N | WTHR_N |

FIG. 9

| | | |
|---|---|---|
| WORK ORDER ID | 00XX | ... |
| DATE | DATE_A | ... |
| SYSTEM COMPONENT(S) | CID_2 TRANSFORMER | ... |
| LOCATION | LOC_2 | ... |
| PROBLEM | DAMAGE_A | ... |
| CAUSE | CAUSE_A | ... |
| CREW | CREW_A | ... |
| INSTRUCTIONS | INSTRUCTIONS_A | ... |
| EQUIPMENT | EQUIP_A EQUIP_N | ... |
| PARTS | PARTS_A PARTS_N | ... |
| WEATHER | WEATHER_A | ... |
| ... | ... | ... |

FIG. 10

LARGE SCALE UNMANNED MONITORING DEVICE ASSESSMENT OF UTILITY SYSTEM COMPONENTS

FIELD OF THE DISCLOSURE

The present invention generally relates to utility systems, and more particularly to monitoring and inspecting utility system components.

BACKGROUND

The North American power grid has been characterized by the Smithsonian Institution as the largest machine ever built by mankind. The size, geographic diversity, environmental diversity, and the multitude of components that comprise the power grid presents unique challenges in the rapid and efficient upgrading the system with diverse new technologies that realize America's objective of improved power grid reliability and hardening. Accordingly, utility systems are an integral part of modern day life. Unfortunately, components of these systems may become inoperable. For example, consider an electrical power substation that is part of a power grid. Substations perform various functions such as transforming voltage, connecting two or more transmissions lines, transferring power, and protecting the grid from short circuits and overload currents. In many instances substation equipment is susceptible to damage, which may result in power outages throughout the grid. Power outages decrease customer satisfaction and damaged substation equipment increases costs incurred by the utility provider.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 shows one example of monitoring device data according to one embodiment of the present invention;

FIG. 6 shows one example of area of interest data according to one embodiment of the present invention;

FIG. 7 shows one example of system component data according to one embodiment of the present invention;

FIG. 8 shows one example of inspection path data according to one embodiment of the present invention;

FIG. 9 shows one example of inspection results data according to one embodiment of the present invention;

FIG. 10 shows one example of an autonomously generated work order according to one embodiment of the present invention;

DETAILED DESCRIPTION

Figure 1:
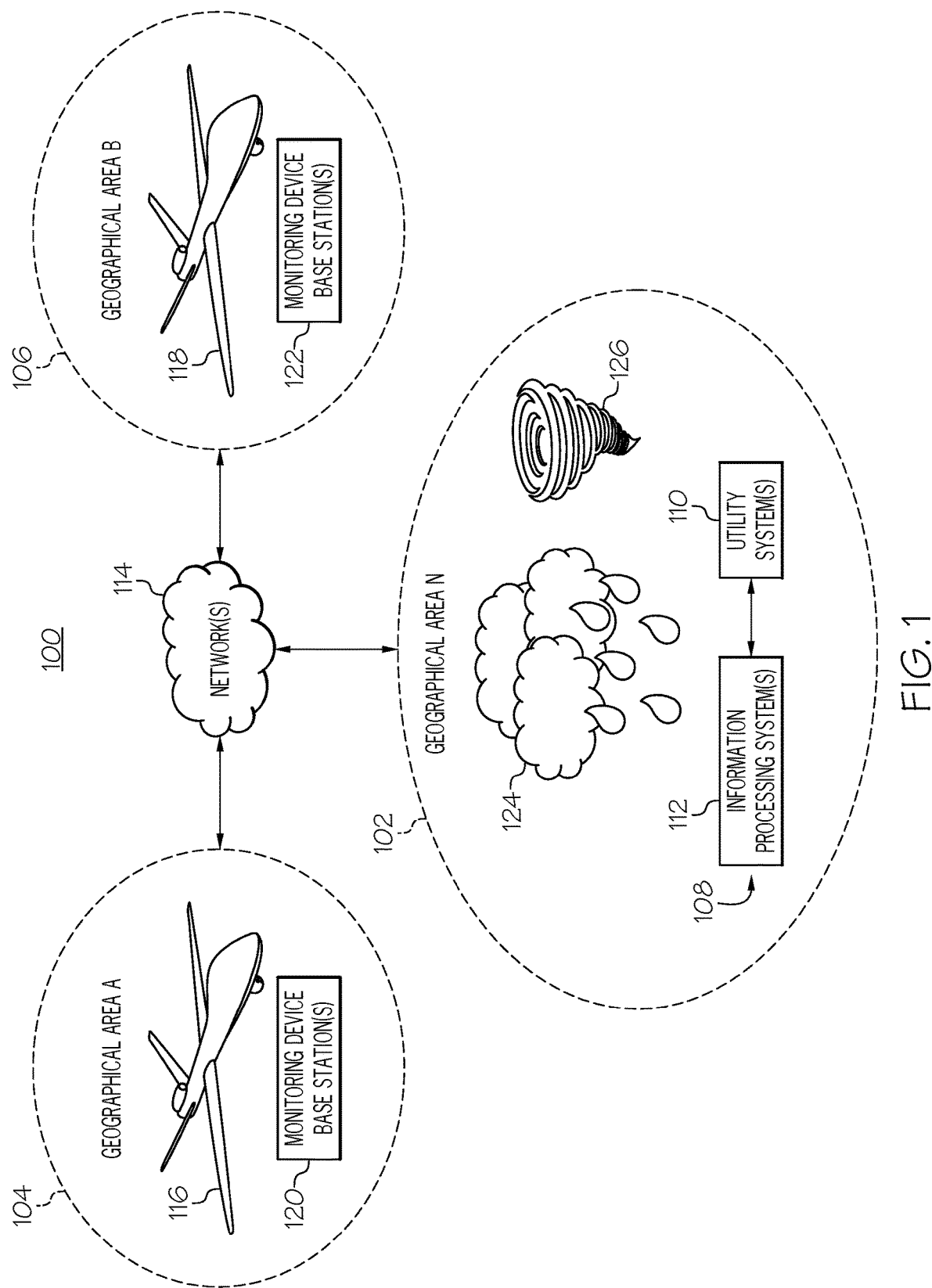
FIG. 1 is an illustrative example of a system for autonomous inspection/monitoring of components within areas of interest according to one embodiment of the present invention.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having", as used herein, are defined as comprising (i.e., open language). The term "coupled", as used herein, is defined as "connected", although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods provide for safe and efficient remote autonomous inspection of system components within areas of interest (AOIs) experiencing natural events such as severe wind, rain, fire, etc. utilizing large scale autonomous monitoring devices. Embodiments of the present invention further facilitate the autonomous generation of work orders for rapid deployment of repair crews. In some embodiments, AOIs are geographical areas comprising utility system components. However, embodiments of the present invention are not limited to utility systems. Components of a utility system may wear down, become damaged, or become inoperable. Depending on the geographical location of these components; current weather conditions; types of damage or operational issues; and/or the like it may be difficult to detect, locate, and remedy the issues within an acceptable amount of time. This may result in increased downtime of the system component(s), which decreases customer satisfaction and increases costs incurred by the utility provider.

Conventional utility system inspection/monitoring mechanisms generally involve dispatching work crews to inspect and identify any worn down or damaged component(s), the extent of damage, cause of damage, etc. These conventional mechanisms are problematic because they increase the downtime of the system component, increase outages experienced by the customer, increase expenses incurred by the utility provider, etc. For example, it takes times for a crew to reach a site to assess damage, identify inoperable components, and receive repair components. In addition, the work crew may need to operate in dangerous environmental conditions to identify and repair the problematic components. Even further, the environmental conditions (e.g., wind speed) may be such that work crews may be prevented by the conditions, various laws, company policies, and/or the like from travelling to and/or operating in the AOIs. Also, conventional work orders usually do not provide very detailed information or require users to access multiple menus/pages to drill down to information of interest. This can be problematic when viewing work orders on portable electronic devices such as mobile phones, tablets, etc.

Embodiments of the present invention overcome the above problems by implementing an autonomous system across one or more information processing systems. The system autonomously manages large scale (and conventional size) unmanned mobile monitoring devices for obtaining inspection data associated with one or more system components within AOIs, and further for autonomously generating work orders based on the inspection data. As will be discussed in greater detail below, the system determines at least one environmental condition associated with the area of interest. The system if the at least one environmental condition one of fails or satisfies at least one environmental condition threshold for operating within the area of interest. If the least one environmental condition fails to satisfy the at least one environmental condition threshold, the system selects at least a first mobile unmanned monitoring device of a first type to autonomously monitor at least one system component within the area of interest. If the least one environmental condition satisfies the at least one environmental condition threshold, the system selects at least a second mobile unmanned monitoring device of a second type to autonomously monitor the at least one system component. The system then programs the at least first mobile unmanned monitoring device or the at least second mobile unmanned monitoring device that has been selected to autonomously monitor at least one system component within the area of interest.

Embodiments of the present invention allow for system components, such as utility systems components, to be autonomously monitored and inspected for real-time or near real-time during environmental conditions that may prevent human personnel and/or convention monitoring devices from operating therein. Therefore, embodiments of the present invention enable the detection and identification of problems experienced by the components during dangerous operating conditions that would normally prevent work crews and conventional mobile unmanned monitoring devices from operating. In addition, the autonomous system is able to process large amounts of data of different types captured by large scale unmanned aerial vehicles, which allows for more efficient and accurate detection of damaged system components when compared to conventional systems. Work orders may be autonomously generated before (or shortly after) the environment conditions have subsided, and the required parts, equipment, and work crews identified within the work order may be autonomously provisioned. This provides an advantageous improvement in response time when compared to conventional systems. The above allows for system/component down time, customer dissatisfaction, and utility provide expenses to be greatly decreased since work crews do not need to be dispatched to diagnose the problem. In addition, embodiments of the present invention generate an interactive map allowing work crew members to see important work order, system component, and inspection data information on displays of, for example, mobile phones and tablets without having to parse through multiple, windows, menus etc.

FIG. 1 shows one example of an operating environment 100 for remote autonomous inspection of utility system components. In one embodiment, the operating environment 100 comprises one or more geographical areas 102, 104, 106. At least one geographical area 102 may comprise one or more AOIs 108. The AOI may be a defined area(s) within the geographical area 102 comprising geographical features, components of a utility system 110 situated at various locations within the AOI 108, and/or the like.

Examples of geographical features includes rivers, streams, hills, cliffs, mountains, trees, boulders, and/or the like. Examples of utility systems include power grid systems (e.g., fossil fuel based, solar-based, wind-based, nuclear-based generation, transmission and/or distribution subsystems), telephone systems (landline and wireless), water systems, gas systems, and oil systems. Each of these different types of utility systems may have multiple types of subsystems. For example, an electric power delivery system generally comprises a generation subsystem, a transmission subsystem, and a distribution subsystem. Each of these of these subsystems performs one or more specific functions and comprises multiple components. For example, the distribution subsystem of an electric power system comprises substations where each substation performs various functions for a power grid such as transforming voltage, connecting transmissions lines, transferring power, and protecting the grid from short circuits and overload currents, and/or the like. Components of a substation include, but are not limited to, incoming and outgoing power lines, transformers, disconnect switches, circuit breakers, arresters, etc. Other non-limiting examples of utility system components include utility poles, transmissions lines, solar panels, cooling towers, pipelines, and/or the like.

The operating environment 100 may further comprise one or more information processing systems 112 disposed within one or more of the geographical areas 102 to 106. As will be discussed in greater detail below, the information processing system(s) 112 may manage the autonomous inspection of utility system components, generation of work orders, and provisioning of resources. The information processing system(s) 112 may be located within the same geographical area as the AOI 108 being inspected or be located within a geographical area that is remote from the AOI 108 being inspected.

The information processing system(s) 112 may be communicatively coupled to other components of the operating environment 100 (and components outside the environment 100) by one or more networks 114. The network 114 may comprise wired and/or wireless networking mechanisms, and may further comprise wireless communication networks, non-cellular networks such as Wireless Fidelity (WiFi) networks, public networks such as the Internet, private networks, and/or the like. The wireless communication networks support any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication networks may include one or more networks based on such standards. For example, in one embodiment, a wireless communication network may comprise one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like.

FIG. 1 further shows that the operating environment 100 may comprise one or more monitoring/inspection devices 116, 118 disposed at a location(s) within one or more of the geographical areas 102 to 106. As will be discussed in greater detail below, the monitoring devices 116, 118 may be configured to remotely and autonomously inspect utility system components. The monitoring devices 116, 118 may be associated with a base station(s) 120, 122 located within one or more of the geographical areas 102 to 106. The base station(s) 120, 122 may comprise charging/fueling areas for the devices 116, 118; shelter for the devices 116, 118; and/or the like.

In some embodiments, the monitoring/inspection devices 116, 118 may be unmanned mobile monitoring devices such as (but are not limited to) unmanned aerial vehicles (UAVs), drones, rovers, climbing robots, and/or the like having monitoring systems such as optical cameras, infrared sensors, LIDAR, RADAR, acoustic systems, and/or the like. The monitoring devices 116, 118 may be manually and/or autonomously operated. At least one of the monitoring/inspection devices 116, 118 is a large-scale monitoring device such as a large-scale UAV, rover, and/or the like.

A large-scale monitoring device may be a monitoring device that is capable of traversing through environmental conditions that are deemed unsafe for human personnel. Large-scale mobile monitoring devices may have an increased size over conventional-scale mobile monitoring devices; increased flying/roving ranges over conventional-scale monitoring devices; increased payload capacities over conventional-scale mobile monitoring devices; increased environmental capabilities over conventional-scale mobile monitoring devices such that these devices may traverse in/through events having environmental conditions that conventional-scale mobile monitoring devices are unable to traverse or are prohibited from traversing; and/or the like. In one or more embodiments, a large-scale monitoring device may be a monitoring device that exceeds one or more specifications provided in the U.S. Code of Federal Regulations for small unmanned aircraft.

In many instances, a geographical area 102 may experience natural (or man-made) events 124, 126 such as heavy winds, rain, tornados, hurricanes, fires, earthquakes, flooding, and/or the like that make it unsafe and difficult for human personnel (e.g., work crews) and/or conventional sized unmanned mobile monitoring devices to operate within. Therefore, as will be discussed in greater detail below, embodiments may utilize one or more monitoring devices 116, 118 such as a large-scale unmanned mobile monitoring device that are capable of operating in during events 124, 126 and associated environmental conditions to inspect the AOIs 108 and their utility system(s) 110. The large-scale unmanned mobile monitoring device may be deployed from the geographic area 102 experiencing the event 124, 126 and/or may be deployed from a remote geographical area 104, 106 that may or may not be experiencing the event (or another event).

Figure 2:
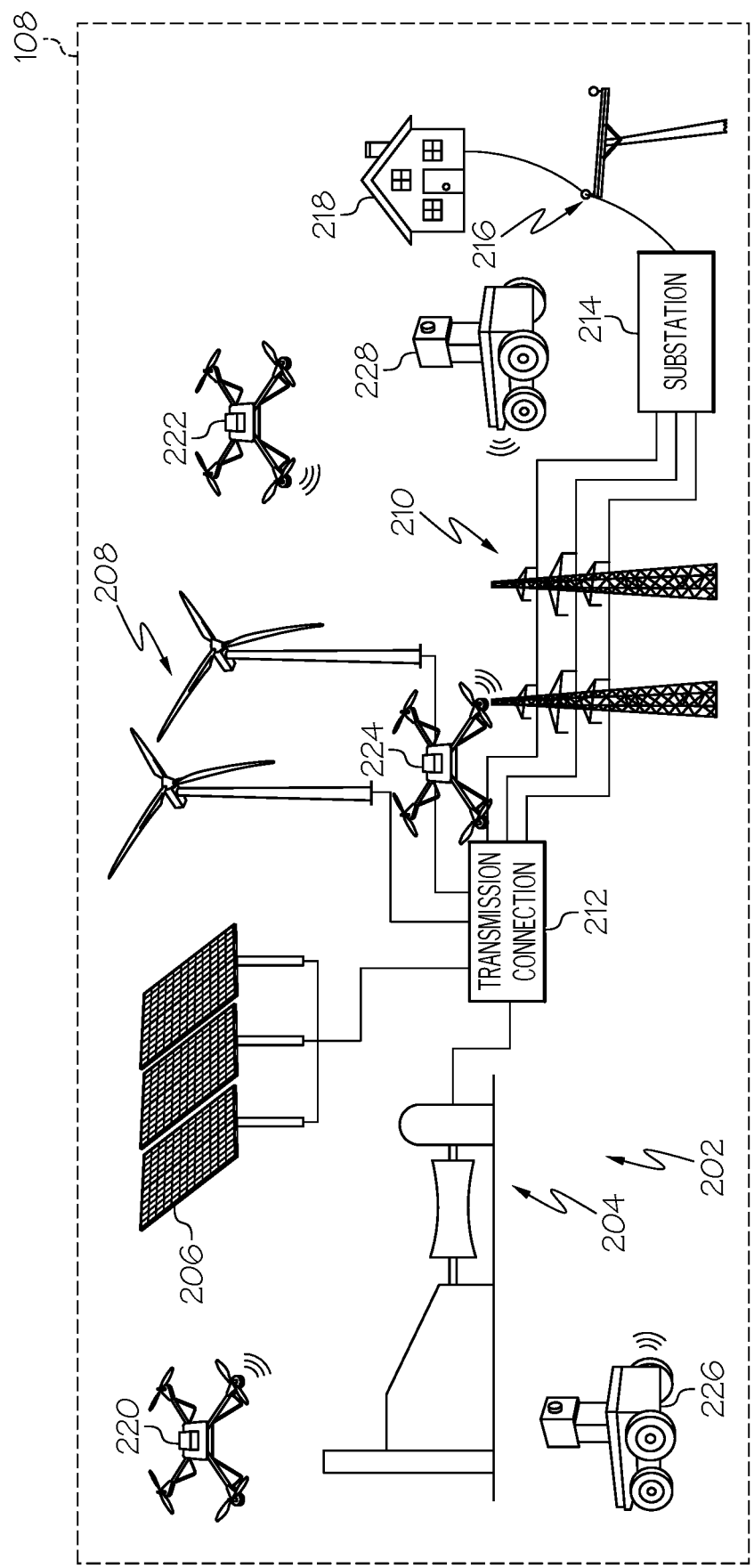
FIG. 2 is more detailed illustrative example of a system for autonomous inspection/monitoring of components within areas of interest according to one embodiment of the present invention.

FIG. 2 shows a more detailed example of an AOI 108 located within a geographical area 102. In the example shown in FIG. 2, the AOI 108 includes an electrical power "grid" that is used to provide electrical power to consumer premises 218. AOI 108 may contain a multitude of individual or overlapping AOIs. The example shown in FIG. 2 depicts a number of example power generation components 202 for the utility system 110. Illustrated are a combined cycle gas generator 204, a solar array farm 206, and a wind farm 208 AOIs. In further examples, operational contexts are able to include one power generation component, multiple collocated power generation components, power generation components that are physically separated and supply a common electrical power transmission or distribution system, any one or more power generation components, or combinations of these. These power generation components are able to be of any suitable type or design.

In this example, electrical power generated by one or more power generation components is provided to a power transmission system 210. The illustrated example depicts a transmission connection 212 that couples one or more sources within power generation components 202 to the power transmission system 210. The transmission connection 212 and power transmission system 210 AOIs in an example include suitable step-up transformers and long-distance transmission lines to convey the generated electrical power to remote power distribution networks, other electrical power consumers, or both.

The illustrated power transmission system 210 provides electrical power to one or more distribution systems including a substation 214, distribution lines 216, and premises 218. The substation 214 AOI may include transformers, protection devices, and other components to provide electrical power to power distribution lines 216. The power distribution lines 216 deliver power produced by the generating components 202 to customer premises, such as the illustrated home 218. In general customer premises are coupled to the power distribution system 210 and are able to include any combination of residential, commercial, or industrial buildings. FIG. 2 further shows one or more monitoring/inspection devices 220 to 228 being placed at and/or traversing one or more locations within the AOIs 108.

Figure 3:
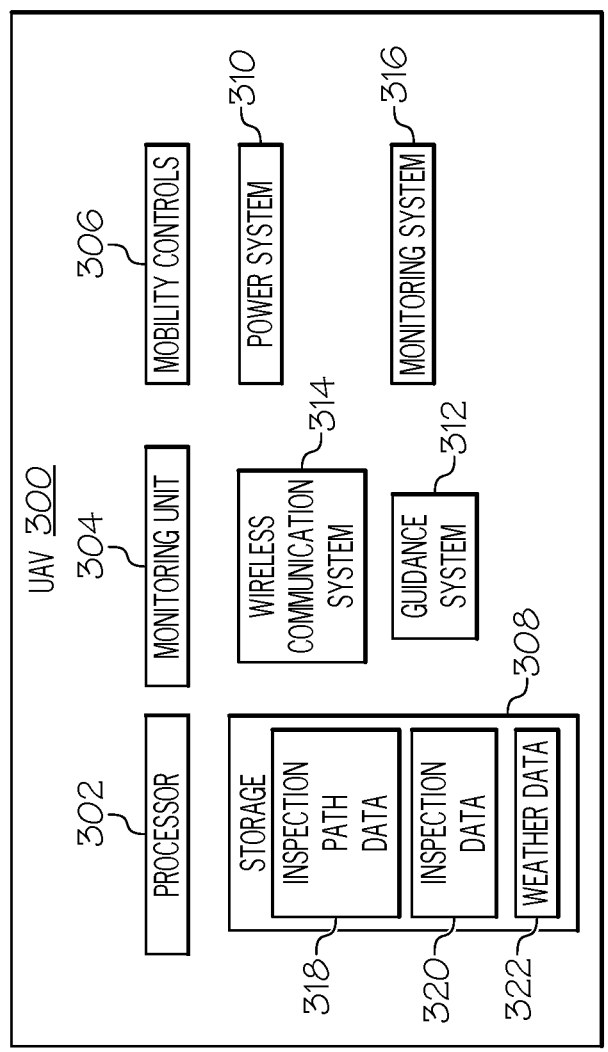
FIG. 3 is a block diagram illustrating one example of a mobile unmanned monitoring device according to one embodiment of the present invention.

FIG. 3 shows one non-limiting example of a large-scale monitoring device 300 corresponding to the monitoring devices 116, 118 of FIG. 1. In this example, the monitoring device 300 comprises one or more processors 302, a monitoring unit 304, mobility controls 306, one or more storage units 308, one or more power systems 310, one or more guidance systems 312, one or more wireless communication systems 314, and a monitoring system 316. The processor(s) 302 may perform various computing functions for the monitoring device 300. The monitoring unit 304 may control automated mobility (e.g., flying, roving, climbing, etc.) operations of the device 300; receive data from the information processing system 112 such inspection path data and instructions indicating that the monitoring device 300 is to initiate mobility operations; manages monitoring/inspection operations to be performed by the device 300 for one or more system components of the AOI 108; and/or the like.

In one embodiment, the monitoring unit 304 utilizes the monitoring system 316 and computer/machine learning mechanisms to autonomously identify system components; determine a current operational state of the system components; determine any problems with and/or damage to the components; monitor current weather conditions; and/or the like. The monitoring unit 304 may also control automated mobility operations of the device 300. For example, if the device 300 is a UAV the monitoring unit 304 (and/or processor 302) may autonomously control the various systems and mobility controls/components that enable the monitoring device 300 to traverse an inspection path. The monitoring unit 304 may be part of the processor 302, is the processor 302, or is a separate processor. The monitoring unit 304 is discussed in greater detail below.

The mobility controls 306 comprise various mechanisms and components such as propellers, tracks, motors, gyroscopes, accelerometers, and/or the like that enable the monitoring device 300 to take flight, rove, climb, and/or the like. The mobility controls 306 are autonomously managed and controlled by the monitoring unit 304 and/or processor 302. The storage unit(s) 308 includes random-access memory, cache, solid state drives, hard drives, and/or the like. In one embodiment, the storage unit(s) 308 may comprise inspection path data 318, inspection data 320, weather data 322, and/or the like. The inspection path data 318, in some embodiments, may be received by the monitoring unit 304 from the information processing system 112 and/or is autonomously generated by the monitoring unit 304. The inspection path data 318 may include, for example, predefined and/or autonomously generated coordinates that form a path to be traversed by the monitoring device 300 for inspecting/monitoring one or more system components within an AOI 108. The inspection path data 318 may also include altitude data and speed data that indicate the altitude and speed at which the monitoring device 300 is to traverse one or more portions of the inspection path. The inspection path data 318 may further include data indicating specific angles at which the monitoring device 300 is to position itself relative to a given system component for capturing inspection data 320.

The inspection path data 318 may be stored at the monitoring device 300 and/or at the information processing system 112. In this embodiment, the monitoring unit 304 of the device 300 may receive an instruction from the information processing system 112 indicating that the device 300 is to initiate mobility operations (e.g., initiate flight, roving, climbing, etc.) along with the identifier of the inspection path to be taken. The monitoring unit 304 may analyze the inspection path data 318 to identify the inspection path corresponding to the received identifier. In another embodiment, the monitoring unit 304 autonomously determines which inspection path data 318 to follow based on parameters such as day, time, expected weather, and/or the like.

The weather data 322 may comprise current weather conditions corresponding to the location of the monitoring device 300, current weather conditions at the AOI 108 to be inspected, expected weather conditions along the flight/roving path, expected weather conditions at the AOI 108, and/or the like. The weather data 322 may be obtained from the information processing, a remote information processing system, and/or the monitoring system 316. For example, the monitoring system 316 may comprise environmental sensors that enable weather data to be captured. In one embodiment, the weather data 322 may be stored at the monitoring device 300 the information processing system 112, and/or a remote information processing system.

The power system(s) 310 provides power to the monitoring device 300 and its components. The power system(s) 310 may include batteries, photovoltaic components, fuel, and/or the like. The guidance system 312, in one embodiment, may comprise components such as a Global Positioning System (GPS) tracking system, accelerometers, gyroscopes, magnetometers, collision avoidance components (e.g., LIDAR, RADAR, etc.), and/or the like. The GPS tracking system may be utilized to plot trajectories of the device 300 and determine the location, speed, heading, and altitude of the device 300. The accelerometer(s) may also be utilized to determine the speed of the device, while the magnetometer(s) may be utilized to determine the device's heading. The gyroscope enables the device 300 to correct its orientation with respect to the ground. The GPS tracking system may utilize one or more of the location, speed, heading, and altitude data to adjust the course of the device 300. The collision avoidance components enable the device to detect obstacles in its path and adjust its location, speed, heading, and/or altitude accordingly.

The wireless communication system 314 comprises components such as Wi-Fi based transmitters/receivers, cellular-based transmitter/receivers, etc. that enables the device 300 to send and receive secured and/or unsecured wireless communications. The wireless communication system 314 may also include wired network components that may be utilized to transmit data while the device 300 is docked at a docking station, recharging station, and/or the like. The monitoring system 316, in one embodiment, comprises one or more optical cameras, infrared sensors, LIDAR, RADAR, acoustic systems, and/or the like that capture their respective data types associated with system components within an AOI 108. The captured data is stored as inspection data 320. The monitoring system 316 may also include one or more environmental sensors that enable the measurement/detection of temperature, humidity, precipitation quantity, precipitation type, precipitation intensity, air pressure, wind speed/direction, lightning, and/or the like.

Figure 4:
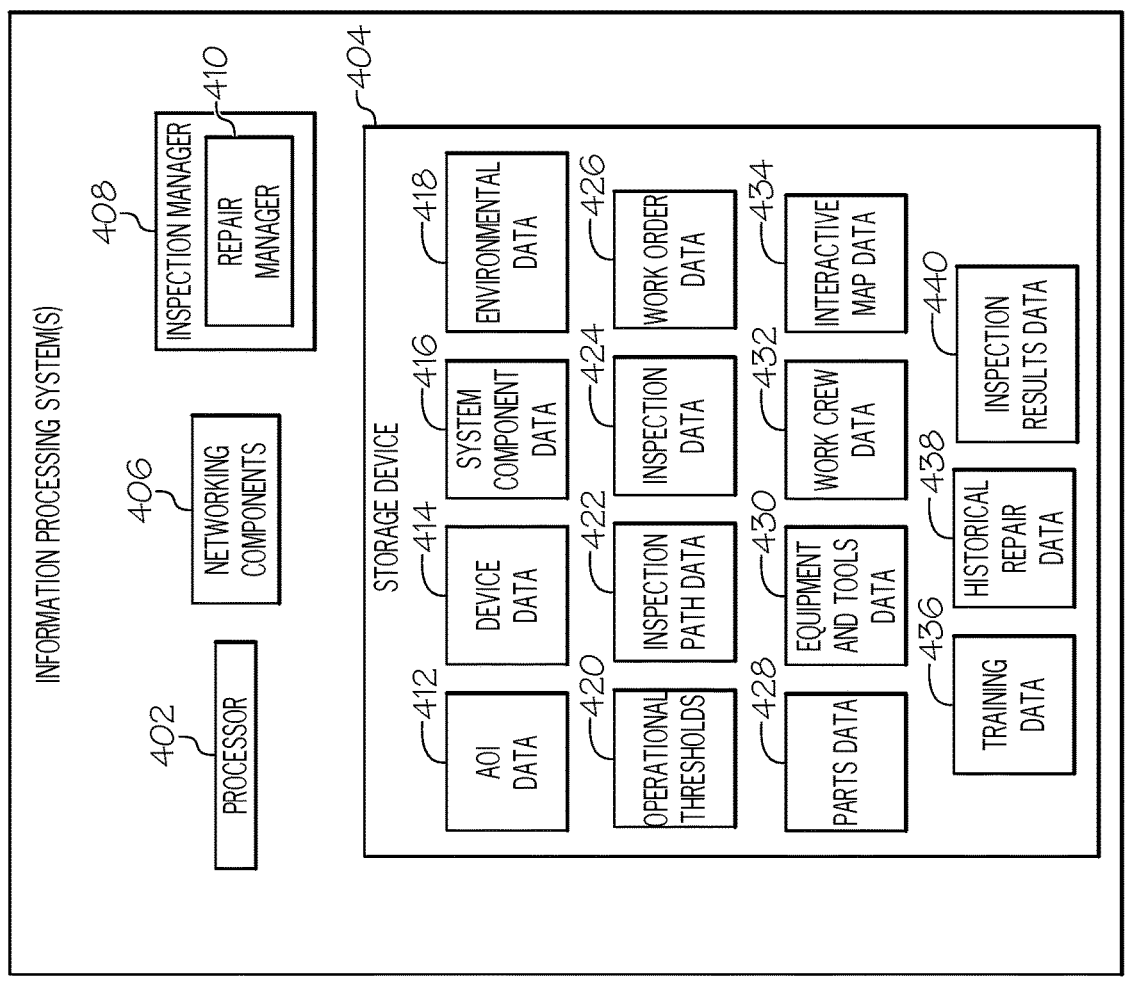
FIG. 4 is a block diagram illustrating one example of an information processing system for managing autonomous inspection/monitoring of components within areas of interest according to one embodiment of the present invention.

FIG. 4 shows one non-limiting example of the information processing system 112. The information processing system 112 may include one or more processors 402; one or more storage devices 404; networking/communication components 406; and an inspection manager 408 comprising a repair manager 410. In one embodiment, the storage device(s) 404 may store various types of data such as AOI data 412, monitoring device data 414, utility system component data 416, environmental data 418 (e.g., weather data, event data, etc.), operational threshold data 420, inspection path data 422, inspection data 424, work order data 426, parts data 428, equipment and tool data 430, work crew data 432, interactive map data 434, training data 436, repair data 438, inspection results data 440 and/or the like. It should be noted that although FIG. 4 shows the various types of data 412 to 440 residing within the storage device(s) 404, one or more of these datasets may reside outside of the storage device(s) 404 on one or more remote information processing systems. It should also be noted that one or more of the information processing system components may be distributed across multiple information processing systems. The components of the information processing system 112 are discussed in greater detail below. In some embodiments, the inspection manager 408 performs one or more operations performed by the monitoring unit 304 of the monitoring devices 116, 118, and vice versa.

As discussed above, geographical areas 102 comprising AOIs 108 such as utility systems 110 may experience natural (or man-made) events 124, 126 having environmental conditions such as heavy winds, rain, tornados, fires, hurricanes, and/or the like. During these events and conditions components of utility systems 110 may become damaged and inoperable. Due to Occupational Safety and Health Administration (OSHA) standards, company policies, etc. work crews may not be allowed to work outside in the AOI 108 during the events 124, 126. For example, current OHSA standards set a safety threshold of 49 mph for wind speed that prohibits work crews from working outside when the wind speed is over 49 mph. These standards may also prohibit the operation of vehicles, planes, helicopters, and/or like by humans when the environmental conditions do not satisfy the safety thresholds/policies. Therefore, damage assessment by human-based work crews is usually limited to start after an "all clear" is determined. This may be several hours or days after an event has impacted an AOI 108. This delay in damage assessment may result in increased danger to customers, decreased customer satisfaction, increased costs incurred by the utility provider, and/or the like.

Accordingly, in one or more embodiments, the inspection manager 408 selects and programs at least one monitoring/inspection device 116, 118 based on at least current and/or expected environmental conditions of a given AOI(s) 108 and one or more operational thresholds 420. In one example, the monitoring devices 116, 118 disposed within the AOI(s) 108 and other geographical areas 104, 106 may be of different types and of different configurations. For example, some monitoring devices may be large-scale devices while other devices may be conventional-scale mobile monitoring devices. It should be noted that in some embodiments, one or more monitoring devices 116, 118 may have a size that is similar to a conventional hobby or professional UAV/drone but may be configured to/capable of traversing through events 124, 126.

In one embodiment, the inspection manager 408 monitors current environmental conditions and/or expected conditions within AOIs 108 and/or surrounding geographical areas 102 to 106. The inspection manager 408 may utilize one or more sensors within the operating environment 100 and/or monitoring devise 116, 118 to obtain environmental data 418 for the AOIs 108 and/or surrounding geographical areas 102 to 106. The inspection manager 408 may also receive environmental data 418 from one or more remote information processing systems as well. The inspection manager utilizes the environmental data 418 (which may comprise current, historical, and predicted environmental data) to determine the current and/or expected environmental conditions for the AOIs 108 and/or surrounding geographical areas 102 to 106. For example, based on the obtained environmental data 418, the inspection manager 408 may determine the current/expected wind speeds; rainfall; snowfall; lightning activity; tornado activity; ground conditions such as downed trees, flooding, etc.; seismic activity; smoke particles in the air; and/or the like.

The inspection manager 408 may determine the current/expected environmental conditions based on detecting an issue with the utility system 110; may continuously or periodically monitor current/expected environmental conditions; and/or the like. In some embodiments, the inspection manager 408 determines that an AOI 108 may require an inspection based on its current and/or expected environmental conditions. Therefore, in this embodiment, the inspection manager 408 first monitors/determines the current and/or expected environmental conditions and then determines that an inspection is or may be required for the AOI(s) 108 based on the monitoring/determination. In other embodiments, the inspection manager 408 may determine that an AOI 108 may require an inspection based on a detected issue with the utility system 110, inspection schedule or another time-based schedule, a request received from a user, and/or the like. In these embodiments, the inspection manager 408 may first determine that an inspection is or will be required and then determines the current/expected environmental conditions of the AOI(s) 108 and/or surrounding geographical areas 102 to 106.

When the inspection manager 408 determines that an inspection is to be performed for components within one or more AOIs 108, the inspection manager 408 analyzes its obtained environmental condition data 418 for the AOI 108 (and optionally the surrounding geographic areas) with respect to one or more operational thresholds 420, which may include thresholds such as safety threshold, environmental condition thresholds, and/or the like. The operational thresholds 420 may be set by a governing body such as OSHA, the company performing/managing the inspection, and/or the like. In some embodiments, the operational thresholds 420 may indicate when human personnel may/not work outdoors; indicate the types and/or configurations of monitoring device 116, 118 that may operate during given environmental conditions; and/or the like. For example, an operational threshold 420 may indicate that human personnel are not allowed to operate outdoors when the wind speed is greater than 49 mph. In another example, an operational threshold 420 may indicate that when the wind speed is greater than 49 mph a monitoring device 116, 118 must have a given environmental condition rating/capability. In another example, an operational threshold 420 may specify a given wind speed, amount of rainfall or snow, and/or the like.

The inspection manager 408, in one embodiment, compares the current and/or expected environmental conditions for a given AOI 108 (and/or its surrounding geographical area) to one or more operational thresholds 420 to determine whether a monitoring device 116, 118 is to be used for the inspection as compared to human personnel, the type and/or configuration of monitoring device 116, 118 to be used, and/or the like. For example, if the inspection manager 408 determines that current and/or expected environmental conditions for a given AOI 108 (and/or its surrounding geographical area) fail to satisfy an operational threshold 420 allowing human personnel to operate within the AOI 108, the inspection manager 408 may analyze the monitoring device data 414 to identify and select one or more monitoring devices 116, 118 that may operate in the current and/or expected environmental conditions.

In another example, the inspection manager 408 may determine that current and/or expected environmental conditions for a given AOI 108 (and/or its surrounding geographical area) fail to satisfy (or satisfy) an operational threshold 420 indicating a type/configuration of monitoring device 116, 118 that may operate within the AOI 108 during the current/expected environmental conditions. In this embodiment, the inspection manager 408 analyzes the monitoring device data 414 to identify and select one or more monitoring devices 116, 118 that may operate in the current and/or expected environmental conditions. In some embodiments, the inspection manager 408 does not utilize the thresholds 420 but identifies and selects one or more monitoring devices 116, 118 capable of operating within the current and/or expected environmental conditions.

After the inspection manager 408 determines that a monitoring device 116, 118 is to be utilized for performing the inspection operation based on the current and/or expected environmental conditions and/or thresholds 420, the inspection manager 408 analyzes the monitoring device data 414 to determine and select one or more monitoring devices 116, 118 to perform the inspection operation(s). Monitoring device data 414 for a given monitoring device may comprise data such as (but not limited to) device type, environmental rating and/or capabilities, device payload, device flight ceiling, sensor data, power source(s), communication capabilities, mobility capabilities, operational range/time(s), and/or the like.

The inspection manager 408 may obtain monitoring device data for a given AOI and other geographical areas in different ways. For example, the inspection manager 408 may utilize one or more of the networking components 406 to establish a communication link with a remote information processing system(s) (not shown) via the network 114, where the communication link may be secure or unsecure. In this example, the remote information processing system stores monitoring device data. Upon establishing the communication link, the inspection manager 408 may download the monitoring device data 414 stored at the remote information processing system and then store this data as local monitoring device data 414 in the one or more storage devices 404. In other embodiments, the inspection manager 408 does not download the remotely stored monitoring device data but accesses and processes this data directly on the remote information processing system. Alternatively, the remote information processing system may push its monitoring device data to the inspection manager 408 at one or more predefined intervals and/or upon new monitoring device data being obtained by the remote information processing system.

FIG. 5 shows various examples of monitoring device data 414. In the example shown in FIG. 5, each row 502, 504, 506 in the table 500 corresponds to monitoring device data for a given set of monitoring devices; an individual monitoring device; and/or monitoring device accessories such as refueling/recharging docking systems and weather protection enclosures. Each row 502, 504, 506 may be referred to herein as a "monitoring device profile". In this example, each column within the table 500 stores a different type of data. It should be noted that embodiments of the present invention are not limited to the types of data shown in the columns of FIG. 5. Also, one or more of the columns shown in FIG. 5 may be removed and/or additional columns having different types of data may be added. It should also be noted that monitoring device profiles for different monitoring devices are not required to be stored in a single table and may be stored separate from each other.

In the example shown in FIG. 5 the table 500 comprises a first column 508 entitled "Device ID"; a second column 510 entitled "Device Type"; a third column 512 entitled "Envrn Cpblty"; a fourth column 514 entitled "Power Source(s)"; a fifth column 516 entitled "Comm"; a sixth column 518 entitled "Sensor/Feature Data"; a seventh column 520 entitled "Mobility"; an eighth column 522 entitled "Op Features"; a ninth column 524 entitled "Loc"; a tenth column 526 entitled "Op Time"; and an eleventh column 528 entitled "Op Costs".

The "Device ID" column 508 comprises entries 530 comprise a unique identifier for the device associated with the monitoring device profile. It should be noted that in some embodiments, each row in the table is a monitoring device profile for a group of identical devices such as a given product. For example, a monitoring device profile may represent a given product such as a specific UAV model. In this embodiment, the identifier uniquely identifies the product as a whole. In other embodiments, a monitoring device profile represents an individual device where multiple identical device each of their own monitoring device profile. In this embodiment, the identifier uniquely identifies the individual device.

The "Device Type" column 510 comprises entries 532 indicating the device type of the monitoring device(s) associated with the device profile. Examples of device types include (but are not limited to) UAV, rover, climbing robot, camera, and/or the like. The "Envrn Cpblty" column 512 comprises entries 534 indicating the environmental rating of the device, the environmental capabilities of the device, type of environmental protection that is utilized by the device, and/or the like. This information indicates the types and/or specific conductions such as wind speed, amount of precipitation, water depth, and/or the like that the device is capable of operating in. These entries may also indicate the International Protection (IP) Marking code of the device; degree of protection against electromagnetic pulses; degree of protection against drops, bumps, and falls; and/or the like.

The "Power Source(s)" column 514 comprises entries 536 identifying the types of power sources utilized by the device and their operating characteristics. For example, a power source entry may indicate that the monitoring device comprises a rechargeable or disposable (non-chargeable) battery; number of batteries; whether a rechargeable may be charged using solar or non-solar mechanisms; battery chemistry; battery voltage; battery capacity; battery power; and/or the like. The "Communication" column 516 comprises entries 538 identifying the communication capabilities of the device. For example, a communication entry may indicate whether the device has wired and/or wireless communication abilities; the communication standards/networks supported by the device; security protocols implemented by the device; and/or the like.

The "Sensor/Feature Data" column 518 comprises entries 540 identifying and/or describing the sensors/features that are implemented on the monitoring device(s). For example, these entries may indicate whether the device(s) has a GPS system; accelerometer; a barometer; a weather sensor; an optical imaging system for capturing photographs and/or video; the type of image sensor utilized by the system (e.g., visible light sensor, infrared sensor, etc.); the resolution of the system; focal length of lens; zoom capabilities; and/or the like. The sensor data entries may also indicate if the device has a thermal sensor; ion sensor; plasma sensor; audio sensor; and/or the like, and further identify the operating capabilities of these sensors. The "Mobility" column 520 comprises entries 542 indicating the mobility capabilities of the device. For example, a mobility entry may indicate whether the device is fixed or mobile; identify a mobility modality such as flight, ground traversal, climbing, and/or the like; if the device is a camera whether it can be panned and/or tilted; and/or the like.

The "Operating Features" column 522 comprises entries 544 indicating specific features of the device. For example, an operating feature entry may identify the roving, flight, or climbing speed of the device; the number of wheels or propellers; the altitude limit of the device; whether the device has a return to base feature when batter levels are low; and/or the like. The "Loc" column 524 comprises entries 546 indicating the location of the associated monitoring device. The location may be indicated by longitude and latitude coordinates, the ID of the AOI if the device is located within an AOI, and/or the like. The "Op Time/Range" column 526 comprises entries 548 indicating the operating time and/or range of each device of the device before recharging or refueling is needed. The "Op Costs" column 528 comprises entries 550 indicating the costs associated with operating the device. For example, these entries may indicate the purchase cost of the device; prices for replacement parts; average cost to operate the device on a daily, monthly, and/or yearly basis; and/or the like. The average operating cost may take into consideration factors such as expected repairs or parts replacement, fuel or electricity costs, and/or the like.

As discussed above, the inspection manager 408 analyzes the monitoring device data 414 to determine and select one or more monitoring devices 116, 118 to perform the inspection operation(s) based on the current/expected environmental conditions for a given AOI 108 (and optionally its surrounding geographic areas) and, in some embodiments, the thresholds 420. For example, the inspection manager 408 may determine that the current and/or expected environmental conditions for an AOI 108 are wind speeds over 49 mph with precipitation of 1 inch/hr. Therefore, the inspection manager 408 analyzes the monitoring device data 414 to determine a monitoring device(s) 116, 118 comprising environmental capabilities/ratings that satisfy these conditions.

For example, the inspection manager 408 analyzes information within the monitoring device data 414 such as device type 510, environmental capabilities/ratings 512, sensor/feature data 518, mobility 520, operational features 522, location, 524, operational time 526, and/or the like to identify one or more inspection devices 116, 118 for selection. Information such as environmental capabilities/ratings 512 may be utilized by the inspection manager 408 to determine whether the associated monitoring device 116, 118 is capable and/or allowed to operate within the current/expected environmental conditions of the AOI(s) 108 to be inspected. Information such as device type 510, sensor/feature data 518, mobility 520, and operational features 522 may be utilized by the inspection manager 408 to identify monitoring devices 116, 118 that are capable of performing the type of inspection operation(s) being requested. For example, the requested inspection operation(s) may require a device that can fly where some of the monitoring devices may be only ground based. Information such as location 524 and operational time 526 may be utilized by the inspection manager 408 to, for example, identify devices that are capable of travelling from their base location to the AOI 108 (and optionally back to the base location) without refueling or recharging; identify devices that may be located in a geographical area not experiencing the event 124, 126 at the AOI 108 or at least has better environment conditions than the AOI 108; and/or the like.

In addition to the monitoring device data 414, the inspection manager 408 may also utilize AOI data 412 when determining a monitoring device(s) 116, 118 to select and program for the inspection operations. AOI data 412 may comprise data such as (but not limited to) the geographical type of the AOI, geographical features within the AOI, geographical size or boundaries of the AOI, elevation of the AOI, historical weather of the AOI, local and/or migratory wildlife data for the AOI, and/or the like. The inspection manager 408 may obtain AOI data 412 for a given AOI 108 in different ways such as those discussed above with respect to the monitoring device data 414. In some embodiments, the AOI data 412 obtained from remote information processing system may comprise data for all AOIs associated with one or more entities (e.g., utility providers) utilizing the inspection manager 408. In other embodiments, the inspection manager 408 may obtain the remote AOI data on an as needed basis. For example, when the inspection manager 408 determines an AOI 108 requires inspection operations the inspection manager 408 may obtain AOI data for the specific AOI 108 (and possibly related AOIs as well).

FIG. 6 shows various examples of AOI data 412. In the example shown in FIG. 6, each row 602, 604, 606 in the table 600 corresponds to AOI data for a given AOI and is referred to herein as an "AOI profile". In this example, each column within the table 600 stores a different type of data. It should be noted that embodiments of the present invention are not limited to the types of data shown in the columns of FIG. 6. Also, one or more of the columns shown in FIG. 6 may be removed and/or additional columns having different types of data may be added. It should also be noted that AOI profiles for different AOIs are not required to be stored in a single table and may be stored separate from each other.

In the example shown in FIG. 6 the table 600 comprises a first column 608 entitled "AOI ID"; a second column 610 entitled "Location"; a third column 612 entitled "Size"; a fourth column 614 entitled "Terrain Type"; a fifth column 616 entitled "Elevation"; a sixth column 618 entitled "Features"; and a seventh column 620 entitled "Historical Weather". The "AOI ID" column 608 comprises entries 622 such as a unique identifier that uniquely identifying each AOI and its profile in the table 600. The "Location" column 610 comprises entries 624 with data identifying the location of the AOI associated with the AOI profile. One example of location data includes a range of longitude and latitude coordinates defining the area encompassed by the AOI. The "Size" 612 column comprises entries 626 indicating the geographical size of the AOI. The "Terrain Type" column 614 comprises entries 628 indicating the type of terrain associated with AOI. For example, the entries may indicate the terrain type as "Hill", "Desert", "Mountain", "Open", etc. The "Elevation" column 616 comprises entries 630 indicating the elevation of the AOI.

The "Features" column 618 comprises entries 632 identifying geographical features and (optionally) their locations within the AOI. For example, a feature entry under this column may indicate the AOI has a river/stream, mountain, cluster of trees, boulders, and/or the like at specific locations within the AOI. In another example, a feature entry may indicate that the ground within the AOI is comprised of gravel, grass, cement, and/or the like. The "Historical Weather" column 620 comprises entries 634 having historical weather data such as weather patterns for the AOI. For example, the entries under this column may indicate the daily, weekly, monthly, and/or yearly average temperatures, humidity levels, wind speeds, rainfall, snowfall, UV levels, and/or the like.

The inspection manager 408 may utilize the AOI data 412 to determine for example, determine the location and size of the AOI 108 to be inspected, various geographical features of the AOI 108 to be inspected, and/or the like. The AOI data (and other AOI data) may then be used by the inspection manager 408 when determining one or more monitoring devices 116, 118 to select and program for the inspection operation. For example, based on the AOI data 412 and the monitoring device data 414, the inspection manager 408 is able to determine the distance each of the monitoring devices 116, 118 within the operating environment 100 and the AOI 108 to be inspected; the type of terrain the monitoring device 116, 118 has to traverse; and/or the like.

Accordingly, in some embodiments, the inspection manager 408 not only utilize the monitoring device data 414 to determine monitoring devices 116, 118 that are capable of operating within the current/expected environmental conditions of the AOI 108 (and/or surrounding geographical areas) but further utilize the monitoring device data 414 in combination with the AOI data 412 to determine monitoring devices 116, 118 that are also capable of operating according to various AOI attributes such as distance, terrain etc. For example, the inspection manager 408 may analyze the location data 524 and operating time data 526 of the monitoring devices 116, 118 in combination with the location data 610 of the AOI 108 to be inspected to determine a monitoring device that is able to traverse at least the distance between its base location to the AOI 108 without refueling/recharging.

Based on the operations discussed above, the inspection manager 408 selects one or more monitoring devices 116, 118 to perform the inspection operation(s). The inspection manager 408 may select a monitoring device within the AOI 108 and/or outside of the AOI 108. For example, the AOI 108 may include a monitoring device that satisfies the operational thresholds 420, environmental capabilities, etc. In another example, the inspection manager 408 may select a monitoring device 116, 118 from a location that is remote from the AOI 108 and not experiencing the event 124, 126 and environmental conditions of the AOI 108.

Once selected the monitoring devices 116, 118 may be programmed by the inspection manager 408 to perform the requested inspection operation(s). For example, the inspection manager 408 may program the selected monitoring devices 116, 118 with one or more inspection paths for performing inspection operations with respect to system components within the AOI 108. In other embodiments, the monitoring unit 304 of the monitoring device 116, 118 may program the monitoring device with one or more inspection paths. The inspection paths may be predefined and/or may be autonomously generated by the inspection manager 408. The inspection paths may be stored within the storage device(s) 404 of the information processing system 112 as inspection path data 422. In an embodiment where the inspection manager 408 autonomously generates the inspection paths, the inspection manager 408 analyzes the AOI data 412, monitoring device data 414, and utility system component data 416 to determine a given inspection path for a given monitoring device 104 to perform inspection operations for one or more system component(s).

The utility system component data 416 may comprise data such as (but not limited to) a unique identifier of the component; part number of the component; location of the component; function of the component; configuration data; and/or the like. The inspection manager 408 may obtain system component data 416 for a given AOI 108 utilizing methods similar to those discussed above with respect to the AOI data 412 and the monitoring device data 414. FIG. 7 shows various examples of system component data 416. In the example shown in FIG. 7, each row 702, 704, 706 in the table 700 corresponds to system component data for system components located within AOIs and is referred to herein as an "system component profile". In this example, each column within the table 700 stores a different type of data. It should be noted that embodiments of the present invention are not limited to the types of data shown in the columns of FIG. 7, and one or more columns shown in FIG. 7 may be removed and/or additional columns having different types of data may be added. It should also be noted that system component profiles for different system components are not required to be stored in a single table and may be stored separate from each other. In some embodiments, the system component data 716 may be part of the AOI data 412.

In the example shown in FIG. 7 the table 700 comprises a first column 708 entitled "Component ID"; a second column 710 entitled "Component Type"; a third column 710 entitled "AOI"; a third column 714 entitled "Part Number"; a fourth column 716 entitled "Location"; and a fifth column 718 entitled "Function". The "Component ID" column 608 comprises entries 720 that include a unique identifier for the component associated with the system component profile. The identifier may be a serial number or any other identifier that uniquely identifies the system component. The "Component Type" column 610 comprises entries 622 indicating the type of system component (e.g., transformer, solar panel, wind turbine, etc.) associated profile. The "AOI" column 712 comprises entries 724 with data identifying the AOI where the given system component location resides. The AOI entries may comprise a pointer to the corresponding AOI profile within the AOI data 710 and/or a unique identifier of the AOI. In some embodiments, an AOI profile for a given AOI may comprise an entry having the unique identifiers of the system components residing within the AOI and/or pointers to the corresponding system component profiles.

The "Part Number" column 714 comprises entries 726 indicating the part number/model of the system component. The "Location" column 716 comprises entries 728 identifying the location of the system component within the AOI. For example, location entries may comprise latitude/longitude coordinates of the component; altitude data; and/or the like. The "Function" column 718 comprises entries 730 identifying/describing the functions and features of the component.

When the inspection manager 408 determines a monitoring device 116, 118 requires inspection path data 422 based on, for example, the selection process discussed above, the inspection manager 408 utilizes one or more of the AOI data 412, monitoring device data 414, and utility system component data 416 to determine a given inspection path for a given monitoring device 116, 118. The inspection manager 408 may analyze the AOI data 412, the monitoring device data 414, and/or the utility system component data 416 to determine information such as the location of the device 116, 118; the location of the AOI 108 to be inspected; geographical features of the AOI; the device's operational capabilities (e.g., range, battery life, mobility capabilities, inspection capabilities, etc.); the system components within the AOI 108; the location of the components within the AOI; system component configuration; and/or the like. The inspection manager 408 analyzes the obtained data and autonomously generates one or more inspection paths for the monitoring device 116, 118 and stores the path as inspection path data 422.

For example, the inspection manager 408 may determine that the inspection/monitoring device 116 is a UAV located at position P_1 and is to inspect system component located at P_N within the AOI 108 and having a height of H_1. The inspection manager 408 may further determine that monitoring device 116 has flight capabilities, a battery capacity of C, and an operational range of R. The inspection manager 408 also determines that the AOI comprises a cluster of trees near the system component at position P_2. Even further, the AOI 108 and/or one or more geographical areas between the AOI 108 and the monitoring device 116 may be experiencing one or more of the events 124, 126.

Taking this data into consideration, the inspection manager 408 autonomously generates one or more flight paths for the monitoring device such that the device avoids the cluster of trees and is able to perform one or more inspection operations with respect to the system component while being able to return to its home base (or at least a recharging station) prior to depleting its power/energy source(s). The one or more flight paths may also be generated such that the monitoring device 116 avoids any events 124, 126 (or at least minimizes interaction with the events) between the home base of the monitoring 116 device and the AOI 108. The inspection manager 408 may utilize one or more machine learning mechanisms for generating an inspection path. A discussion on machine learning mechanisms is provided in greater detail below. In some embodiments, the monitoring unit 304 may perform the operations discussed herein with respect to selecting and/or autonomously generating an inspection path for its monitoring device 116 to traverse. It should be noted that, in some embodiments, the monitoring unit 304 of a monitoring device 116 may perform the operations discussed above with respect to the inspection paths.

Once the inspection manager 348 has selected and/or generated an inspection path for a given monitoring device 116, the inspection manager 408 stores the path as inspection path data 422. FIG. 8 shows various examples of inspection path data represented as a table 800. In the example shown in FIG. 8, each row 802 to 808 in the table 800 corresponds to an inspection path. It should be noted that in other embodiments, each inspection path 802 to 808 is stored separate from one another. The table 800 comprises a plurality of columns, each storing a different set of information. In this example, the table 800 comprises a first column 810 entitled "Inspection Path ID"; a second column 812 entitled "Device ID"; a third column 814 entitled "Coordinate Data"; a fourth column 816 entitled "Altitude Data"; a fifth column 818 entitled "Speed Data"; a sixth column 820 entitled "Temporal Data"; and a seventh column 822 entitled "Inspection Angle(s)". It should be noted that the inspection path data 422 is not limited to the items shown in FIG. 8 as one or columns may be removed, or additional columns added.

The "Inspection Path ID" column 810 comprises entries 824 uniquely identifying each inspection path in the inspection path data. The "Device ID" column 812 comprises entries 826 identifying the monitoring device 116, 118 associated with the inspection path. The entries 826 may include the unique ID associated with the monitoring device; a pointer to the monitoring device profile associated with the device; and/or the like. The "Coordinate Data" column 814 comprises entries 828 with coordinate data, which may be in three-dimensional space, defining a path and pattern to be traversed. Two or more of the inspection paths may have different traversal patterns or all inspection paths may have the same traversal pattern. In one embodiment, the coordinates of an inspection path are defined such that the monitoring device avoids colliding with any of the system components, other monitoring devices, minimizes interaction with inclement weather, etc. In addition, two or more inspection paths may have coordinates that overlap with each other.

The "Altitude Data" column 816 comprises entries 830 having altitude data for the corresponding inspection path. For example, the altitude data may define a given altitude a monitoring device 116 is to fly at while traversing the corresponding inspection path. In some embodiments, the altitude data may include different altitudes for different portions of the inspection path. The different altitudes may be time-based and/or coordinate-based. The "Speed Data" column 818 comprises entries 832 having speed data for the corresponding inspection path. For example, the speed data may define a given speed the monitoring device 116 is to fly, rove, climb, and/or the like while traversing the inspection path. In some embodiments, the speed data may include different speeds for different portions of the inspection path. The different speeds may be time-based, altitude-based, and/or coordinate-based. The inspection path data 422 may also comprise additional information such as the time/day the monitoring device is to initiate traversal of an inspection path, time/day the monitoring device is to utilize the inspection path. For example, a monitoring device may be assigned different inspection paths based for different periods of time, expected weather patterns, and/or the like.

The "Temporal Data" column 820 comprises entries 834 indicating at when the device is to traverse the flight path. For example, these entries may identify one or more days, one or more times, and/or the like that the device is to traverse the associated flight path. The "Inspection Angle(s)" column 822 comprises entries 836 indicating one or more angles at which a monitoring device 104 is to position itself relative to a given system component for capturing inspection data 424. It should be noted that the inspection path data may be dynamically updated by the inspection manager 408 and/or monitoring unit 304 as the monitoring device 116 is traversing the path. The inspection path data may also be updated while the monitoring device 116 is docked at a docking station or a refueling/recharging station.

In one embodiment, the inspection manager 408 establishes a communication link with the selected monitoring device(s) 116, 118 and transmits the inspection path(s) to the device 116, 118. The monitoring device(s) 116, 118 stores the inspection path within a storage unit 308 as inspection path data 318. When the monitoring unit 304 of the monitoring device 116, 118 determines that inspection operations are to be performed, the monitoring unit 304 initiates traversal of one or more inspection paths based on the inspection path data 318. For example, the monitoring unit 304 may receive a signal from the information processing system 112 instructing the monitoring unit 304 to perform the inspection operations. In another example, the monitoring unit 304 may have previously received data from the information processing system 112 identifying the day and times the monitoring device 104 is to perform inspection operations with respect to system components. This data may be transmitted by the information processing system 112 as part of inspection path data, separate from the inspection path data, and/or the like.

In another embodiment, the monitoring unit 304 may dynamically determine when an inspection should be performed. For example, the monitoring unit 304 may utilize one or more sensors within the monitoring system 316 or receive environmental data 418 from the information processing system (or another system) to determine, for example, that inclement weather or other environmental conditions are approaching, occurring, and/or has occurred within an AOI 108. Upon a determination that inclement environmental conditions are approaching or expected, the monitoring unit 304 may autonomously operate the device 116, 118 to perform an inspection to establish an operational state of the system component prior to the inclement weather. When the monitoring unit 304 determines the inclement weather has passed or if the monitoring device 116, 118 determines (similar to the process utilized by the inspection manager 408) that it has the capability to operate in the detected/expected environmental conditions, the monitoring unit 304 may autonomously operate the monitoring device 116, 118 to perform an inspection of the system component. The inspection data captured prior to the inclement weather may be compared against the inspection data captured after the inclement weather to determine any changes in the operational state of the system component. In some embodiments, the inspection manager 408 may perform the above operations as well.

As the selecting monitoring device(s) 116, 118 traverses an inspection path(s), the device 116, 118 performs inspection operations with respect to one or more system components within an AOI. The monitoring device 116, 118 utilizes its monitoring system 316 to perform the inspection operations. In some embodiment, the monitoring device 116, 118 performs the inspection operations during the event(s) 124, 126. As discussed above, the monitoring system 316 comprises one or more optical cameras, infrared sensors, LIDAR, RADAR, acoustic systems, and/or the like that capture their respective data types associated with system components. As the system component(s) comes into range of the monitoring system 316, the monitoring system 316 captures and records inspection data 320 associated with the system component. For example, the monitoring system 316 captures still images/frames or a video of the system component; audio associated with the system component; temperature measurements for the system component; gas level measurements for the system component; and/or the like. The monitoring system 316 may also continuously capture inspection data 320 and not just when the system components come into range of the monitoring system 316.

The monitoring unit 304 may store the captured data locally as inspection data 320 and/or transmit the data to the inspection manager 408 at the information processing system 112. The data may also be transmitted to one or more user devices. The inspection manager 408 may store the received data as inspection data 424. The inspection data 424 may be transmitted to the monitoring unit 304 and/or the user devices at one or more predefined intervals of time. In addition, the inspection data 424 may be transmitted/streamed to the monitoring unit 304 and/or the user devices in real time. The information processing system 112 and/or the user device may then present the inspection data to a user upon receiving the inspection data; at one or more intervals of time; upon request by a user; and/or the like.

After the inspection manager 408 of the information processing system 112 has received inspection data 424 from a monitoring device(s) 116, 118, the inspection manager 408 processes the data to determine a current operational state of system components, determine whether system components are damaged or non-functioning, and/or the like. It should be noted that, at least in some embodiments, determining an operational state of a system component may encompass multiple operations such as determining if the component is operational; non-operational, operating normally (e.g., within expected parameters/thresholds); operating abnormally (e.g., outside expected parameters/thresholds; determining that the component has been damaged, the type of damage, the parts of the component that have been damaged, the location of the damage, the cause of the damage, etc.; determining that the component is being obstructed by debris, the type of debris, the location of the debris, etc.; and/or the like. It should be noted that the monitoring unit 304 of a monitoring device 116, 118 may also be configured to perform these operations as well.

In one embodiment, the inspection manager 408 utilizes one or more machine-learning mechanisms to determine the operational state of the system component, any damaged associated with the component, and/or the like. For example, the inspection manager 408 may utilize a deep learning artificial neural network (DLANN) model trained to recognize system components, determine damage to the system components, determine the type of damage, anticipate damage and/or abnormal operation conditions based on expected weather, and/or the like. It should be noted that other machine learning models and algorithms are applicable as well.

A DLANN model is generally comprised of a plurality of connected units referred to as artificial neurons. Each unit is able to transmit a signal to another unit via a connection there between. A unit that receives a signal from another unit processes the signal and may transmit its own signal to another unit based on the processed signal. A unit may be associated with a state (e.g., 0<x<1) where both a unit and a connection may be associated with a weight that affects the strength of the signal transmitted to another unit. The weight may vary during the learning process of the model. The model may comprise multiple layers of connected units, where different layers perform different transformations on their inputs. The first layer acts as the initial input (e.g., from the inputted data) to the model, where signals from this layer propagate to the final layer (e.g., identified solution). The initial layers of the model may detect specific characteristics of the target solution while inner layers may detect more abstract characteristics based on the output of the initial layers. The final layers may then perform more a complex detection based on the output inner layers to detect the target solution.

The DLANN model utilized by the inspection manager 408, in one embodiment, is trained by providing training data 436 to the model as an input. The model may be trained at the inspection manager 408 and/or at an external information processing system. In one embodiment, the training data 436 comprises different images of a target object such as a system component, a system component in a normal operating state, a system component in an abnormal operating state (e.g., operating outside of normal parameters/thresholds), one or more damaged portions of a system component, obstructions and/or debris interfering with the system component, and/or the like. In one non-limiting example, an AOI 108 comprises one or more transformers to be monitored/inspected. In this example, the training data 436 comprises different images of a transformer in a normal operating state, a transformer in an abnormal operation state, a transformer with one or more portions being damaged, a transformer with trees or tree limbs interfering with the transformer, and/or the like.

In some embodiments, images comprising the target object(s) (e.g., normal operating transformer, abnormal operating transformer, components of transformer having damage, specific types of debris interfering with transformer components, etc.) to be detected by the inspection manager 408 may be annotated with text and/or a bounding box using specific software. It should be noted that other images of target objects not associated with the environment may be used as training data as well. It should be also noted that embodiments of the present invention are not limited to the environments and/or target objects discussed herein.

In some embodiments, the model comprises a convolution layer where a sliding window is passed over each of the training images where each portion of the training image is saved as a separate image. Each of these separate images for each original training file is then fed into the model as training data. The result of this training step is an array that maps out which parts of the original image have a possible target object or part of a target object. Max pooling can then be used to down sample the array. The reduced array may then be used as input into another artificial neural network and the above processes can be repeated. The final artificial neural network (e.g., fully connected network) determines whether a given image comprises a target object and, if so, which portion(s) of the image comprises the target object. It should be noted that the DLANN model may comprise multiple convolution, max-pooling, and full-connected layers. In addition, the trained DLANN model is able to tolerate shadows, variable image backgrounds, exposure settings, and changing scene lighting, etc. A similar training process may be utilized for other types of data such as audio, sensor readings, and/or the like.

Once the object detection model has been trained, the inspection manager 408 implements the model as an object detector. For example, the inspection manager 408 is programmed to detect one or more specific target objects such as a normal operating solar panel, an abnormal operating solar panel, specific components of the solar panel having damage, specific types of debris interfering with solar panel components, etc. from inspection data 424 (e.g., captured images, audio, sensor data, etc.) captured by the monitoring device 116, 118 utilizing the object detector.

For example, as a monitoring device 116, 118 is traversing an inspection path its monitoring system 316 captures inspection data 320 such as (images, audio, sensor readings, location/position/time of device at which the data was captured, etc.) of the AOI 108. In some embodiments, the monitoring system 316 continuously captures inspection data 320 while it is operating or traversing an inspection path. In other embodiments, the monitoring system 316 may be programmed with location data (e.g., coordinates) of specific system components to be inspected. In this embodiment, the monitoring unit 304 utilizes the guidance system 312 to determine when the device 116, 118 is within a threshold distance from the location of the system component(s) and activates the monitoring system 316.

The monitoring unit 304 transmits its captured inspection data 320 to the information processing system(s) 112, as discussed above. The inspection manager 408 stores this data as local inspection data 424. It should be noted that inspection data 320 captured by a monitoring device 116, 118 may be stored on a different information processing system(s) and accessed thereon by the inspection manager 408. The inspection manager 408 processes/analyzes the inspection data 424 to determine if the received inspection data comprises a system component such as transmission lines. If the inspection manager 408 determines that the inspection data comprises or corresponds to a system component to be inspected the inspection manager 408 determines a current operational state of the system component based on the inspection data.

For example, if the inspection data 424 comprises images the inspection manager 408 processes these images utilizing its trained object detector to determine if any of the images comprising the system component show the component having any damage or debris. If not, the inspection manager 408 may determine the system component's operational state is normal. However, if the inspection manager 408 determines the system component has been damaged or that debris is interfering with the system component the inspection manager 408 may determine that operational state of the system component is abnormal.

In some instances, the inspection manager 408 may be unable to determine a current operational state of the system component from the inspection data due to the angle at which the monitoring device captured an image. In one embodiment, the inspection manager 408 may communicate with the monitoring device 116, 118 and instruct the device to capture an image from one or more different angles. The inspection manager 408 may provide specific angles to the monitoring device and/or the monitoring unit 304 of the device may determine additional angles at which to capture the data. In another embodiment, the inspection manager 408 may select and instruct one or more different monitoring devices to perform the additional inspection operations. For example, a different monitoring device may be able to provide images from a different angle, provide different types of data, and/or the like.

In some embodiments, the inspection data 424 comprises data in addition to (or in lieu of) images. For example, the inspection data 424 may include audio data, sensor reading data, and/or the like. As discussed above, the object detector of the inspection manager 408 may also be trained utilizing this type of data as well. Therefore, the inspection manager 408 may also utilize this type of data to detect when a system component has been damaged and/or obstructed; the type of damage and/or obstruction; the location and/or part of the system component that has been damaged and/or obstructed; and/or the like based not only on image data but also audio data, sensor reading data and/or the like. The inspection manager 408 may utilize one or more types of data to detect a current operating condition of a system component and may utilize one or more other types of data to perform a more granular analysis of the system component when damage or an abnormal operating condition has been detected.

For example, when damage or an abnormal operating condition has been detected utilizing a first type of inspection data a second type of inspection data may be utilized to determine the type damage type, the location of the damage and/or the like. It should be noted that when a first set of inspection data comprising one or more inspection data types is utilized to detect a normal operating condition; abnormal operating condition; damage type and/or the like the inspection manager 408 may utilize a second inspection dataset comprising one or more different inspection data types to confirm these detections/determinations. It should be noted that the monitoring unit 304 of one or more monitoring devices 116, 118 may perform the operations of the inspection manager 408 discussed above. For example, the monitoring unit 304 may utilize one or more computer learning mechanisms similar to the inspection manager 408 to perform the inspection operations discussed above.

In some embodiments, the inspection manager 408 stores results of processing the inspection data 424 as inspection results data 440. The results may be used to further train the machine learning components of the inspection manager 408. FIG. 9 shows various examples of inspection results data represented as a table 900. In the example shown in FIG. 9, each row 902 to 906 in the table 900 corresponds to an inspection results for a given system component. It should be noted that in other embodiments, each inspection path 902 to 906 is stored separate from one another. It should also be noted that the inspection results data may be stored as part of other data such as system component data 416, inspection data 424, and/or the like. In addition, a given system component may have multiple entries within the table 900. The table 900 comprises a plurality of columns, each storing a different set of information. In this example, the table 900 comprises a first column 908 entitled "Component ID"; a second column 910 entitled "AOI"; a third column 912 entitled "Location"; a fourth column 914 entitled "Op State"; a fifth column 916 entitled "Damage Type"; a sixth column 918; entitled "Damaged Part"; a seventh column 920 entitled "Time"; and an eight column 922 entitled "Weather". It should be noted that the inspection results data 440 is not limited to the items shown in FIG. 9 as one or columns may be removed, or additional columns added.

The "Component ID" column 908 comprises entries 924 that include a unique identifier for the component associated with the inspection results data. The identifier may be a serial number or any other identifier that uniquely identifies the system component and/or may be a pointer to the system component profile associated with the system component. The "AOI" column 910 comprises entries 926 with data identifying the AOI where the given system component location resides. The AOI entries may comprise a pointer to the corresponding AOI profile within the AOI data 412 and/or a unique identifier of the AOI. In some embodiments, an AOI profile for a given AOI may comprise an entry having the unique identifiers of the system components residing within the AOI and/or pointers to the corresponding system component profiles.

The "Location" column 912 comprises entries 928 identifying the location of the system component within the AOI. For example, these entries may comprise latitude/longitude coordinates of the component; altitude data; and/or the like. The "Op State" column 914 comprises entries 930 identifying the current operational state of the system component as determined by the inspection manager 316 as a result of processing the inspection data 320. For example, these entries may indicate that the system component is operating normal is operating abnormally, is non-operational, is currently being obstructed by and/or interfered with debris, and/or the like. The "Damage Type" column 916 comprises entries 932 indicating the type of damage (if any) experienced by the system component. For example, these entries may indicate that a transformer has exploded; a transmission line has become decoupled; a solar panel has hail damage; and/or the like. The "Damaged Part" column 918 comprises entries 934 indicating specific part or parts of the system component that has been damaged. The "Time" column 920 comprises entries 936 indicating the time at which the inspection was performed. The "Weather" column 922 comprises entries 938 indicating the weather at the time of inspection. The weather data may be utilized as historical weather data for the inspection manager 408 when predicting potential damage to system components upon determining similar weather is expected in the future.

When the inspection manager 408 detects that a system component is experiencing a problem (e.g., a non-operational state, abnormal operational state, has been damaged, has been obstructed and/or the like) the repair manager 410 may autonomously generate a work/repair order for the system component. In one embodiment, a work order may identify the system component to be repaired/replaced; identifies the location of the system component, identifies the problem associated with the system component; identifies the cause of problem; identifies the parts required to repair or replace the system component; identifies the work crew(s) to perform the repair; includes repair/replacement instructions; identifies current and/or expected weather at the location; and/or the like.

In one embodiment, the repair manager 410 may utilize one or more machine/computer learning mechanisms for autonomously generating a work order. Examples of machine/computer learning mechanisms include supervised learning, unsupervised learning, reinforcement learning, and/or the like. In some embodiments, the repair manager 410 implements an artificial neural network (ANN) similar to the discussed above with respect to the inspection manager 408. However, instead of detecting objects within images the repair manager 410 generates work orders based on the inspection results data 440. Work orders generated by the repair manager 410 may be used to further train the machine learning components of the inspection manager 408 and/or the repair manager 410.

The machine/computer learning components of the repair manager 410 may be trained utilizing historical repair data 438, repair manuals for system components, previously generated work orders, and/or the like. The historical repair data 438 may comprise data associated with a plurality of repair/replacement events. Each of these events is associated with a given system component and comprises data such as such as an identification of system component that was previously repaired; the type of damage that was repaired for the component; an identification and description of the parts, tools, and their quantities used to repair the damage; procedures taken to repair the component; time taken to repair the component; the cause of the damage; the weather conditions at the time of damage detection and at the time of repair; work crew identification; work crew details such as identifiers of crew members, crew member qualifications, etc.; and/or the like. In some embodiments, the historical repair data 438 may comprise works order data 426 from work orders previously generated by the repair manager 410 and/or any other entity.

After the machine/computer learning components of the repair manager 410 have been trained, the repair manager 410 is able to autonomously generate work orders for damaged/obstructed system components. The repair manager 410 may store the work orders as work order data 426. For example, the repair manager 410 takes as input and processes the inspection results data 440. If the repair manager 410 determines from the inspection results data 440 that a system component is experiencing a problem, the repair manager 410 initiates one or more autonomous work order generation processes.

Consider the example of inspection results data shown in FIG. 9. Upon processing this data, the repair manager 410 determines the component having the ID of CID_2 is experiencing a problem based on one or more of the Operational State entry, Damage Type entry, or the Damaged Part entry. The repair manager 410 processes the system component data 416 to identify a profile comprising a component ID matching the component ID identified within the inspection results data 440. In this example, the repair manager 410 determines that the system component experiencing a problem is a Type_B system component (e.g., a transformer). It should be noted that the component type information may also be included within the inspection results data 424.

The repair manager 410 may then autonomously generate a work order for the transformer utilizing one or more of its machine learning components and stores this as work order data 426. For example, based on the system components and its attributes (e.g., type, location, configuration, etc.); damage and its attributes (e.g., type, location, cause, etc.); the specific parts of the system component that have been damaged; type of debris obstructing the system component and/or surrounding areas; and/or the like the repair manager 410 determines the parts; tools; equipment; vehicles; work crew type; specific work crew member; and/or the like required for repairing the transformer.

In some embodiments, the inspection results data 440 may not explicitly identify damaged parts of a system component but may identify the cause of damage. For example, the type of damage may indicate that the transformer was struck by lightning. Therefore, the repair manager 410 may determine the parts that were most likely to be damaged by this event. Alternatively, the inspection results data 440 may explicitly identify the damaged parts. Based on the determination of these parts, the repair manager 410 is able to determine the tools and procedures for repairing or replacing these parts based on its machine learning components.

As discussed above, not only does the repair manager 410 determine the parts and tools required to repair system components but also determines the vehicles, equipment, and work crews required to repair the system component. For example, the repair manager 410 may process the AOI data 412, monitoring device data 414, and system component data 416 and determine that the AOI 108 in which the system component is located comprises specific terrain that requires a specific type of repair vehicle for safe travel. The repair manager 410 may also utilize this data to determine that the system component is at a given location and has a given configuration that requires a vehicle with a boom of a specific length. The repair manager 410 may further determine that the particular damage or system component requires a specialized crew. The repair manager 410 utilizes the above data to autonomously generate one or more work orders 426 for repairing or replacing a system component(s).

In some embodiments, the repair manager 410 may autonomously provision and/or assign the required equipment, parts, tools, crews, etc. for a given work order. For example, once the repair manager 410 has determined which parts, equipment, tools, crews, etc. are required for servicing a system component the repair manager 410 may communicate with one or more information processing systems to provisions and/or assigns these items to the job. In some embodiments, the repair manager 410 may analyze parts data 430 to determine if the required parts are available. If not, the repair manager 410 may autonomously order the required parts. In addition, the repair manager 410 may communicate with an information processing system at a parts warehouse, dispatch terminal, and/or the like to autonomously provision available parts to the current job. For example, the repair manager 410 may communicate with one or more information processing systems managing the parts inventory and instructs these systems to provision the parts for the current job.

The repair manager 410 may also perform similar operations with respect to the required equipment and tools. For example, the equipment and tool data 430 may comprise data relating to the equipment and tools available to work crews such as a unique identifier of the equipment/tools; type of the equipment/tools; availability of the equipment/tools; location of the equipment/tools; features of the equipment/tools; and/or the like. The repair manager 410 processes this data to identify equipment and tools that satisfy the repair criteria determined by the repair manager 410. When the repair manager 410 identifies equipment and tools that satisfy the repair criteria the repair manager 410 may autonomously provision the equipment and tools for the job. For example, the repair manager 410 may communicate with one or more information processing systems managing the equipment/tool inventory and instructs these systems to provision the equipment/tools for the current job.

The repair manager 410 may also process work crew data 432 to determine particular crews that have attributes and availability that satisfy criteria required to perform the repairs on the system components. For example, the work crew data 432 may include a unique identifier for each work crew; a unique identifier for each individual that is part of the crew; a current location and/or home base of the crew; a current location of each individual crew member and/or the individual's home base; the availability of the work crew and/or each crew member; the specialties of the work crew and/or each individual crew member; contact information for each crew member; and/or the like. The repair manager 410 processes the above data and selects one or more appropriate work crews, makes substitutions of crew members, and/or the like.

Consider an example were the system component to be repaired is a transmission line. The repair manager 410 processes the work crew data 432 to identify a work crew with a specialization in repairing transmission lines. The repair manager 410 may utilize the work crew data 432 to identify a work crew that has a home base closest to the transmission line or to identify another crew if the first crew is currently not available. The repair manager 410 may further utilize the work crew data 432 to determine if each crew member of the identified work crew is current available. If not, the repair manager 410 may substitute in another crew member based on his/her corresponding information within the work crew data 432. Once a crew and its members have been selected, the repair manager 410 may utilize the contact information (e.g., mobile phone number, landline phone number, email address, pager number, etc.) from the work crew data 432 to autonomously send one or more messages to the communication devices of the crew members. These messages at least inform the crew members that they are required to perform one or more jobs.

After the repair manager 410 has processed the inspection data 424, parts data, equipment and tool data 430, and/or work crew data 432 the repair manager 410 autonomously generates one or more work orders 426. The work order 426 may include data such as an identification of the system component to be repaired/replaced; the location of the system component; the problem associated with the system component; the cause of problem; the work crew(s) and its members assigned to perform the repair; repair/replacement instructions; equipment provisioned or required for the repair; parts provisioned or required for the repair; tools provisioned or required for the repair; current and/or expected weather at the location; and/or the like.

In one or more embodiments, the repair manager 410 establishes a communication with one or more information processing systems, user devices, and/or the like and transmits the generated work order(s) 426 to the devices. FIG. 10 shows one example of a work order 1006 generated by the repair manager 410 being presented on a display 1004 of a user device 1002. A user device 1002 may include cellular telephones, mobile phones, smart phones, in-vehicle devices; two-way pagers, wireless messaging devices, wearable computing devices, laptop computers, tablet computers, desktop computers, personal digital assistants, a combination of these devices, and/or other similar devices.

In the example shown in FIG. 10, the work order 1006 comprises a first row 1008 uniquely identifying the work order. A second row 1010 comprises the time and time associated with the work order 1006. A third row 1012 identifies the system component associated with the work order 1006, provides any details regarding the system component, and/or the like. A fourth row 1014 provides location information associated with the system component(s). A fifth row 1016 problems information regarding the problem associated with system component(s) such as damage, obstruction, etc. The problem information may also include any information determined by the inspection manager 408 such as location of damage, specific parts that are damaged, and/or the like.

A sixth row 1018 provides information identifying the cause of the problem being experienced by the system component(s). A seventh row 1020 identifies and provides information associated with the work crew(s) assigned to the work order. An eighth row 1022 provides instructions on how to repair/replace the system component(s). A ninth row 1024 identifies and provides information associated with the equipment/vehicles and tools required to repair/replace the system component(s). A tenth row 1026 identifies and provides information associated with the parts required to repair/replace the system component(s). An eleventh row 1028 provides information regarding the past, current, and/or expected weather at the repair site. It should be noted that the work order 1006 is not limited to the configuration and the information provided in FIG. 10.

In some embodiments, one or more of the work order entries 1008 to 1028 are selectable by a user to obtain additional information. For example, one or more items in the System Component(s) row 1008 may be selected by a user to view a schematic of the system component that is experiencing a problem. In one embodiment, when a user selects an item within System Component(s) row 1012 the user device 1002 establishes a connection with the information processing system 112 (or another information processing system) to request the additional information. The information processing system 112 obtains the requested information and transmits it to the user device 1002 for presentation to the user. In another embodiment, the repair manager 410 packages this information with the work order 1006 prior to transmitting the work order 1006 to the user device 1002.

In another example, one or more items within the Location row 1014 may be selected to present an interactive map 434 associated with the system component(s) experiencing the problem. The interactive map 434 may be provided to the user device similar to the system component data discussed above. In addition, the information processing system 112 may act as a server for the interactive map 434, which is presented to a user through an application interface. As the user interacts with the map 434 the inspection manager 408 updates the maps and presents information accordingly. It should be noted that the inspection manager 408 is not limited to presenting the interactive map upon selection of an item within the work order 1006. The inspection manager 408 may present the map 434 to a user independent of the work order 1006.

Figure 11:
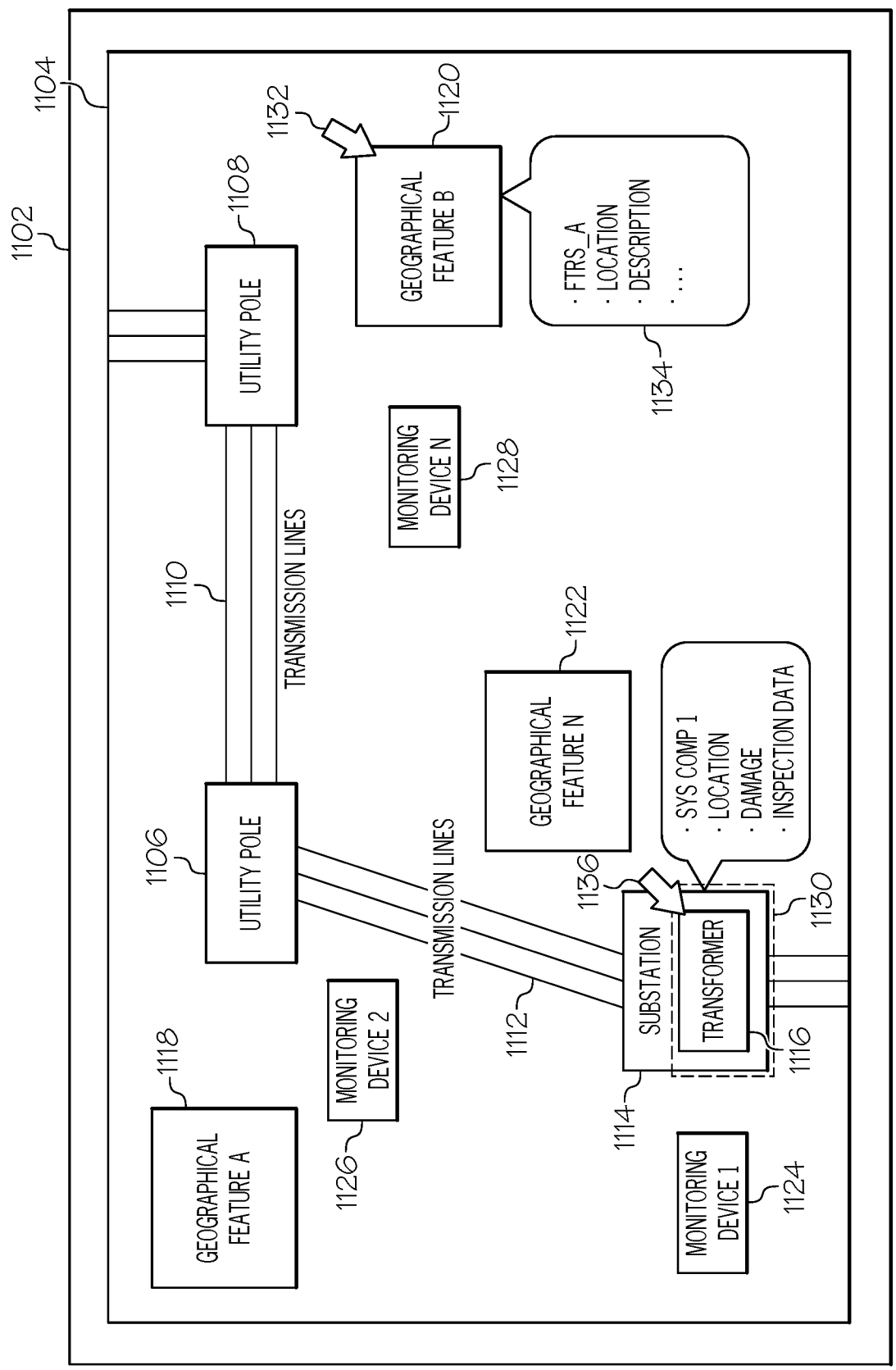
FIG. 11 is an illustrative example of an interactive map representing an area of interest; mobile unmanned monitoring devices; and system components according to one embodiment of the present invention.

FIG. 11 shows one example of an interactive map 1102 generated by the inspection manager 408. In this example, the interactive map 1102 displays the entire AOI comprising the system component associated with the work order 1006. The user is able to zoom in and zoom out on the interactive map to obtain different granularities of information associated with the AOI, system components, topographical features, and/or the like. In the example of FIG. 11, the interactive map 1102 comprises icons/widgets 1104 representing the AOI; system components 1106 to 1114; icons/widgets 1116 to 1122 representing geographical features; and icons/widgets 1124, 1126, 1128 representing the monitoring devices within the AOI. The inspection manager 408 generates and configures the icons/widgets or images representing these components to be selectable by a user. In one embodiment, the system components associated with the work order 1006 are visually highlighted as illustrated by the dashed line 1130 surrounding the box 1116 representing a transformer.

The user is able to select one or more of the icons/widget presented within the interactive map 1102. For example, FIG. 11 shows that when a user selects a geographical widget 1120, as represented by the arrow 1132, the inspection manager 408 may configure the interactive map 1102 to display information 1134 such as an identifier of the features, the location of the topographical feature within the AOI; a type and description of the topographical feature; and/or the like. FIG. 11 also shows that when a system component widget 1116 is selected, as represented by the arrow 1136, the inspection manager may configure the interactive map 1102 to display information such as the component identifier; component location; component description; and/or the like. If the selected system component widget 1116 is associated with a work order 1006, the interactive map 1102 may also display information from the work order and/or inspection results data 440 such as identified damage, repair information, and/or the like. In addition, the work order 1006 may also be presented to the user upon selection of a system component widget 1116 associated with the work order.

In one embodiment, when a user selects a system component widget 1116 associated with work order 1006 and/or selects displayed information such as "damage", "inspection data", etc., the inspection manager 408 may configure the map 1102 to present the user with the images, audio, sensor data, and/or the like utilized by inspection manager 408 to determine the component is experiencing a problem. This allows the crew members to review and familiarize themselves with the issue they have been assigned to address. In another embodiment, the interactive map 1102 allows a user to select one or more of the widgets 1124 associated with a monitoring device. When the inspection manager 408 determines a user has selected a monitoring device widget 1124, the inspection manager 408 configures the map 1102 to present information associated with the device such as location, assigned system components, location, type, features, etc.

In addition, the inspection manager 408 may configure the monitoring device associated with the selected widget 1124 to be controlled by the user via his/her user device 1002. In this embodiment, the map 1102 may be configured to display a user interface to the user for controlling the monitoring device. This allows the user to control the device to obtain additional inspection data that the user may need to repair/replace the system component. Any data captured monitoring device may be presented to the user through the user interface in real time as the user is controlling the device. In one embodiment, commands selected by the user through the user interface for controlling the monitoring device are transmitted to the inspection manager 408. The inspection manager 408 may then transmit these commands to the monitoring device. However, other mechanisms for controlling the monitoring device are applicable as well.

One advantage of the above embodiments is that utilization of monitoring devices capable of operating in an event having environmental conditions deemed unsafe for humans and problematic for conventional monitoring devices is that system components can be inspected during and/or immediately after the event. This greatly reduces the time to obtain inspection data over conventional systems and methods. In addition, embodiments are able to utilize the inspection date to autonomously generate work orders to provision work crews, parts, etc. so that repairs can be performed as soon as the environmental conditions are safe for human personnel. The work orders may be automatically generated, and the resources provisioned prior (or shortly after) to the events 124, 126 and environmental conditions subsiding. The embodiments of the present invention greatly reduce the time to identify, retrieve, and prepare the required parts, equipment, and tools for a given work order as compared to conventional systems, and further enable earlier assignments of outage tickets to restoration crews, improved resource allocation, improved estimated restoration times, quicker material allocation, and reduction of restoration time, etc.

Figure 12:
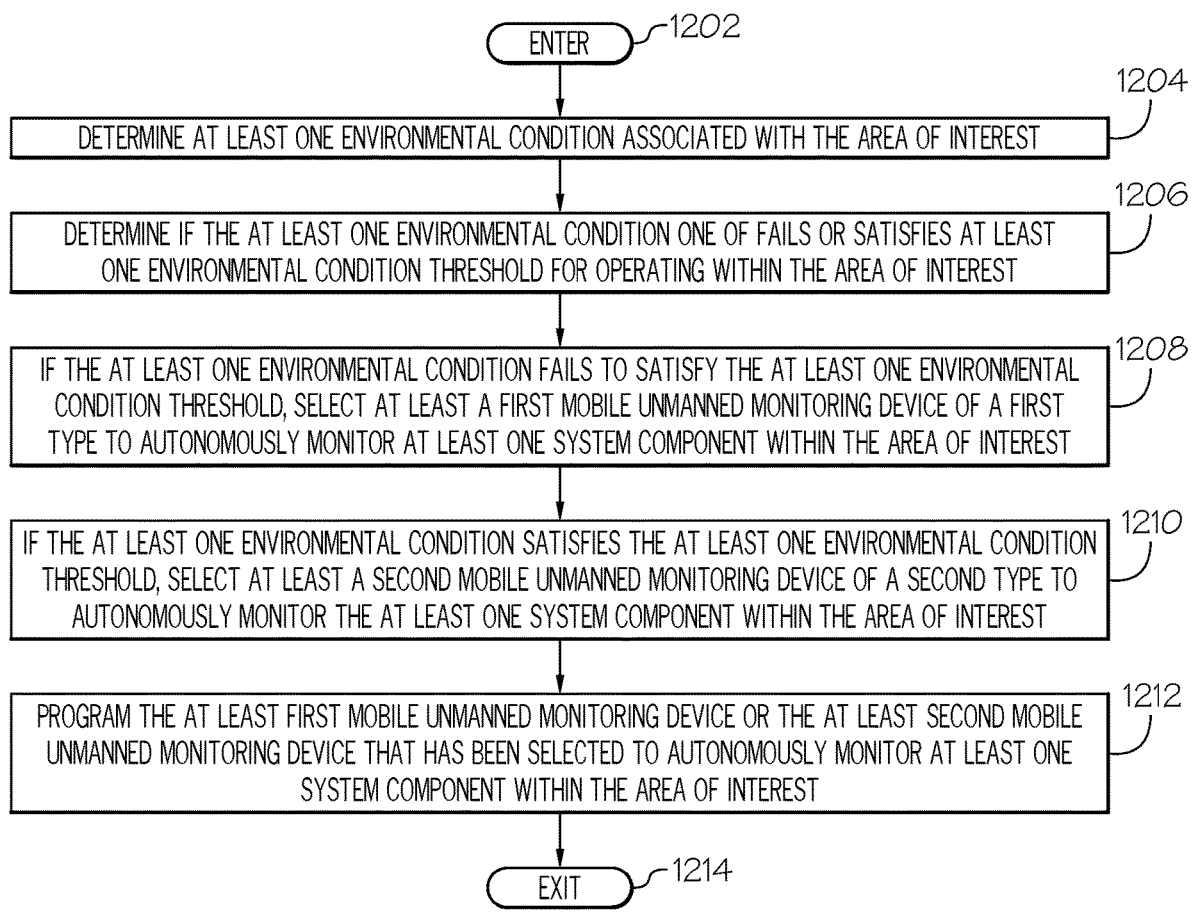
FIG. 12 is an operational flow diagram illustrating one example of managing autonomous inspections of system components within areas of interest during according to one embodiment of the present invention.

FIG. 12 is an operational flow diagram illustrating one example of managing autonomous inspection of components within at least one area of interest. The operational flow diagram of FIG. 12 begins at step 1202 and flows directly to step 1204. The inspection manager 408, at step 1204, determines at least one environmental condition associated with the area of interest. The inspection manager 408, at step 1206, determines if the at least one environmental condition one of fails or satisfies at least one environmental condition threshold for operating within the area of interest.

If the at least one environmental condition fails to satisfy the at least one environmental condition threshold, the inspection manager 408 selects at least a first mobile unmanned monitoring device of a first type to autonomously monitor at least one system component within the area of interest, at step 1208. If the at least one environmental condition satisfies the at least one environmental condition threshold, the inspection manager 408 selects at least a second mobile unmanned monitoring device of a second type to autonomously monitor the at least one system component within the area of interest, at step 1210. The inspection manager 408, at step 1212, programs the at least first mobile unmanned monitoring device or the at least second mobile unmanned monitoring device that has been selected to autonomously monitor at least one system component within the area of interest. The control flow then exits at step 1214.

Figure 13:
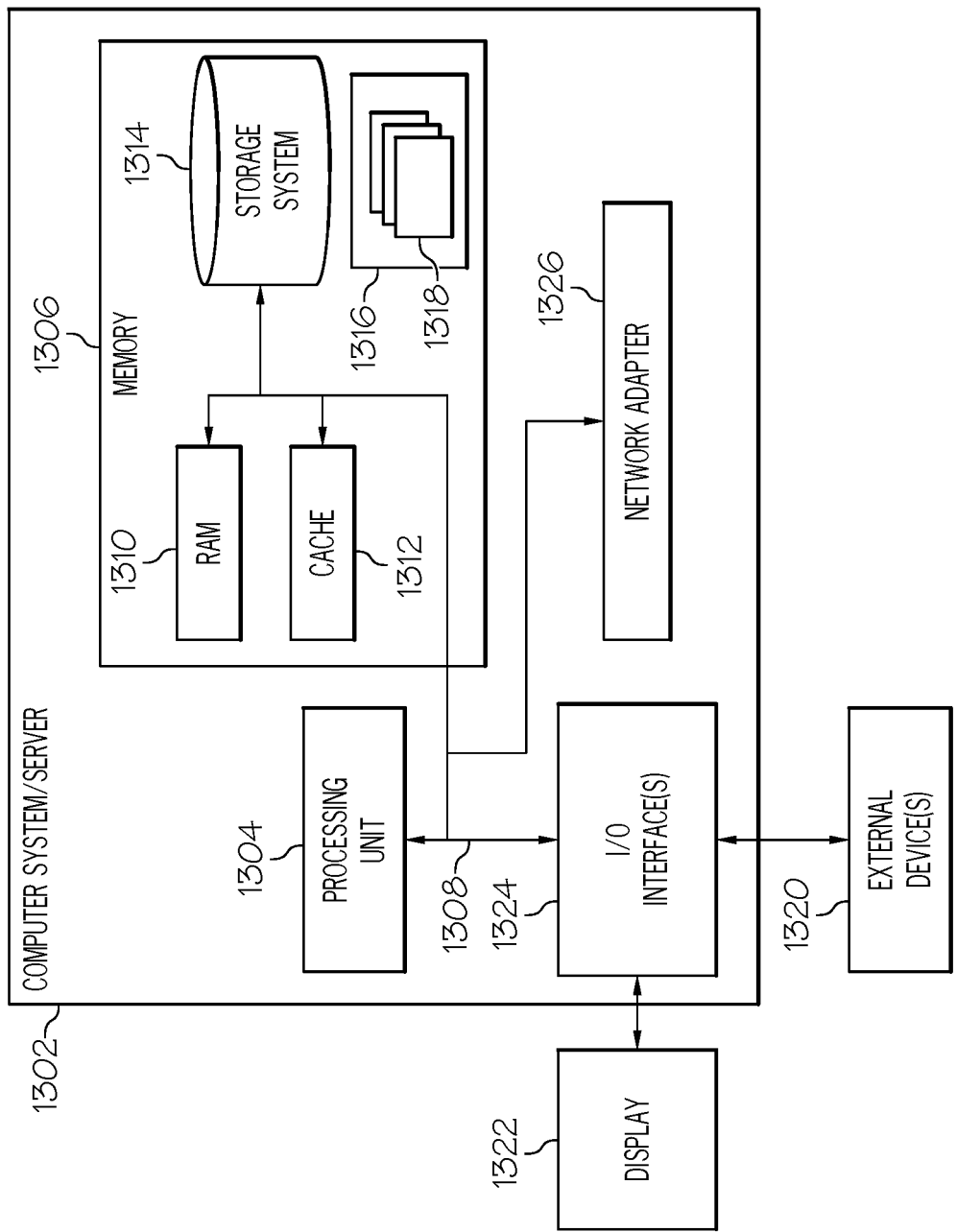
FIG. 13 is a block diagram illustrating another example of an information processing system according to one embodiment of the present invention.

Referring now to FIG. 13, this figure is a block diagram illustrating an information processing system that can be utilized in embodiments of the present invention. The information processing system 1302 is based upon a suitably configured processing system configured to implement one or more embodiments of the present invention such as the inspection manager 408 of FIG. 4. The components of the information processing system 1302 can include, but are not limited to, one or more processors or processing units 1304, a system memory 1306, and a bus 1308, which couples various system components including the system memory 1306 to the processor 1304. The bus 1308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 1306 may include computer system readable media in the form of volatile memory, such as random access memory (RAM) 1310 and/or cache memory 1312. The information processing system 1302 can further include other removable/non-removable, volatile/non-volatile computer system storage media. By way of example only, a storage system 1314 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1308 by one or more data media interfaces. The memory 1306 can include at least one program product having a set of program modules that are configured to carry out the functions of an embodiment of the present invention.

Program/utility 1316, having a set of program modules 1318, may be stored in memory 1306 by way of example, and not limitation, as well as an operating system, one or more application programs, other program modules, and program data. Each of the operating system, one or more application programs, other program modules, and program data or some combination thereof, may include an implementation of a networking environment. Program modules 1318 generally carry out the functions and/or methodologies of embodiments of the present invention.

The information processing system 1302 can also communicate with one or more external devices 1320 such as a keyboard, a pointing device, a display 1322, etc.; one or more devices that enable a user to interact with the information processing system 1302; and/or any devices (e.g., network card, modem, etc.) that enable computer system/server 1302 to communicate with one or more other computing devices. Such communication can occur via I/O interfaces 1324. Still yet, the information processing system 1302 can communicate with one or more networks such as a local area network (LAN), a general wide area network (WAN), and/or a public network (e.g., the Internet) via network adapter 1326. As depicted, the network adapter 1326 communicates with the other components of information processing system 1302 via the bus 1308. Other hardware and/or software components can also be used in conjunction with the information processing system 1302. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems) and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, by an information processing system, of managing autonomous inspection of components within an area of interest, the method comprising:
    determining at least one environmental condition associated with the area of interest;
    determining a plurality of mobile unmanned monitoring devices associated with the area of interest, wherein at least a first mobile unmanned monitoring device of the plurality of mobile unmanned monitoring devices is capable of operating in the at least one environmental condition while at least a second mobile unmanned monitoring device of the plurality of mobile unmanned monitoring devices is at least one of prohibited or not capable of operating in the at least one environmental condition;
    determining if the at least one environmental condition one of fails or satisfies at least one environmental condition threshold for operating within the area of interest such that the at least second unmanned monitoring device is at least one of prohibited or not capable of operating in the at least one environmental condition;
    selecting the at least first mobile unmanned monitoring device to autonomously monitor at least one system component within the area of interest based on determining that the at least second unmanned monitoring device is at least one of prohibited or not capable of operating in the at least one environmental condition;
    selecting the at least second mobile unmanned monitoring device to autonomously monitor the at least one system component based on the at least second unmanned monitoring device not being at least one of prohibited or not capable of operating in the at least one environmental condition; and
    programming the selected at least first mobile unmanned monitoring device or the at least second mobile unmanned monitoring device to autonomously monitor at least one system component within the area of interest.

2. The method of claim 1, wherein the programming comprises:
   programming the selected at least first mobile unmanned monitoring device or the at least second mobile unmanned monitoring device to autonomously monitor at least one system component while the at least one environmental condition is occurring in the area of interest.

3. The method of claim 1, further comprising:
   receiving, from the selected at least first mobile unmanned monitoring device or the at least second mobile unmanned monitoring device, inspection data generated thereby for the at least one system component;
   determining, based on the inspection data, a current operational state of the at least one system component; and
   autonomously generating, based on the current operational state, a work order comprising a plurality of components addressing the current operational state of the at least one system component.

4. The method of claim 3, further comprising:
   autonomously provisioning one or more of the plurality of components for the work order.

5. The method of claim 4, wherein autonomously provisioning one or more of the plurality of components comprises:
   transmitting a communication to at least one information processing system indicating that the one or more of the plurality of components have been assigned to the work order, wherein the communication further comprises instructions for the one or more plurality of components to be sent to a given location.

6. The method of claim 3, wherein autonomously generating the work order comprises:
   determining the current operational state of the at least one system component indicates the at least one system component has experienced damage;
   determining attributes of the damage; and
   determining, based on the attributes of the damage, one or more work crews required to repair the damage and at least one of
      a set of parts required to repair the damage, and
      a set of equipment required to repair the damage.

7. The method of claim 1, wherein the programming further comprises:
   programming the selected at least first mobile unmanned monitoring device or the at least second mobile unmanned monitoring device with
      one or more inspection paths to be traversed thereby with respect to the at least one system component, and
      one or more inspection parameters.

8. The method of claim 1, wherein the at least one environmental condition is wind speed.

9. An information processing system for managing devices for managing an autonomous inspection of components within an area of interest, the information processing system comprising:
   a processor;
   memory communicatively coupled to the processor; and
   an inspection manager communicatively coupled to the processor and the memory that, when operating:
      determines at least one environmental condition associated with the area of interest;
      determines if the at least one environmental condition one of fails or satisfies at least one environmental condition threshold for operating within the area of interest;
      selects and programs at least a first mobile unmanned monitoring device of a first type to autonomously monitor at least one system component within the area of interest based on the at least one environmental condition failing to satisfy the at least one environmental condition threshold;
      selects at least a second mobile monitoring device of a second type to monitor the at least one system component based on the at least one environmental condition satisfying the at least one environmental condition threshold;
      determines a current operational state of the at least one system component based on inspection data associated with the at least one system component and received from the selected at least first mobile unmanned monitoring device or the at least second mobile monitoring device; and
      autonomously generates, based on the current operational state, a work order comprising a plurality of components addressing the current operational state of the at least one system component.

10. The information processing system of claim 9, wherein the inspection manager programs the selected at least first mobile unmanned monitoring device or the at least second mobile unmanned monitoring device by:
    programming the selected at least first mobile unmanned monitoring device or the at least second mobile unmanned monitoring device with
       one or more inspection paths to be traversed by the the selected at least first mobile unmanned monitoring device or the at least second mobile unmanned monitoring device with respect to the at least one system component, and
       one or more inspection parameters.

11. The information processing system of claim 9, wherein the inspection manager, when operating, further
    automatically provisions one or more of the plurality of components for the work order; and
    transmits a communication to at least one information processing system indicating that the one or more of the plurality of components have been assigned to the work order, wherein the communication further comprises instructions for the one or more plurality of components to be sent to a given location.

12. The information processing system of claim 9, wherein the inspection manager autonomously generates the work order by:
    determining the current operational state of the at least one system component indicates the at least one system component has experienced damage;
    determining attributes of the damage; and
    determining, based on the attributes of the damage, one or more work crews required to repair the damage and at least one of
       a set of parts required to repair the damage, and
       a set of equipment required to repair the damage.

13. The information processing system of claim 9, wherein the inspection manager programs the selected at least first mobile unmanned monitoring device or the at least second mobile unmanned monitoring device by:
    programming the selected at least first mobile unmanned monitoring device or the at least second mobile unmanned monitoring device with one or more inspection paths to be traversed thereby with respect to the at least one system component, and one or more inspection parameters.

14. The information processing system of claim 9, wherein the second mobile monitoring device is a manned mobile monitoring device.

15. A computer program product for managing devices for managing an autonomous inspection of components within an area of interest, the computer program product comprising:

a non-transitory computer readable storage medium having computer readable program code embodied therewith, the computer readable program code comprising instructions for:

determining at least one environmental condition associated with the area of interest;

determining a plurality of mobile unmanned monitoring devices associated with the area of interest, wherein at least a first mobile unmanned monitoring device of the plurality of mobile unmanned monitoring devices is capable of operating in the at least one environmental condition while at least a second mobile unmanned monitoring device of the plurality of mobile unmanned monitoring devices is at least one of prohibited or not capable of operating in the at least one environmental condition;

determining that the second mobile unmanned monitoring device is at least one of prohibited or not capable of operating in the at least one environmental condition based on the at least one environmental condition one of failing or satisfying at least one environmental condition threshold for operating within the area of interest;

selecting the at least first mobile unmanned monitoring device to autonomously monitor at least one system component within the area of interest based on determining that the second mobile unmanned monitoring device is at least one of prohibited or not capable of operating in the at least one environmental condition; and programming the selected at least first mobile unmanned monitoring device to autonomously monitor at least one system component within the area of interest.

16. The computer program product of claim 15, wherein the programming comprises:

programming the selected at least first mobile unmanned monitoring device to autonomously monitor at least one system component while the at least one environmental condition is occurring in the area of interest.

17. The computer program product of claim 15, wherein the computer readable program code further comprises instructions for:

receiving, from the selected at least first mobile unmanned monitoring device, inspection data generated thereby for the at least one system component;

determining, based on inspection data, a current operational state of the at least one system component; and autonomously generating, based on the current operational state, a work order comprising a plurality of components addressing the current operational state of the at least one system component.

18. The computer program product of claim 17, wherein the computer readable program code further comprises instructions for:

autonomously provisioning one or more of the plurality of components for the work order; and transmitting a communication to at least one information processing system indicating that the one or more of the plurality of components have been assigned to the work order, wherein the communication further comprises instructions for the one or more plurality of components to be sent to a given location.

19. The computer program product of claim 17, wherein autonomously generating the work order comprises:

determining the current operational state of the at least one system component indicates the at least one system component has experienced damage;

determining attributes of the damage; and determining, based on the attributes of the damage, one or more work crews required to repair the damage and at least one of a set of parts required to repair the damage, and a set of equipment required to repair the damage.

20. The computer program product of claim 15, wherein the programming further comprises:

programming the selected at least first mobile unmanned monitoring device with one or more inspection paths to be traversed thereby with respect to the at least one system component, and one or more inspection parameters.

* * * * *